(12) United States Patent
Xie et al.

(10) Patent No.: US 7,521,394 B2
(45) Date of Patent: Apr. 21, 2009

(54) NANOPARTICLES CONTAINING TITANIUM OXIDE

(75) Inventors: Rong-Cai Xie, Anqing (CN); Jian-Ku Shang, Mahomet, IL (US); Pinggui Wu, Tonawanda, NY (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 11/615,702

(22) Filed: Dec. 22, 2006

(65) Prior Publication Data
US 2007/0202334 A1    Aug. 30, 2007

Related U.S. Application Data

(60) Provisional application No. 60/754,680, filed on Dec. 29, 2005.

(51) Int. Cl.
*B01J 21/06* (2006.01)
*B82B 1/00* (2006.01)
*C01G 23/047* (2006.01)

(52) U.S. Cl. .................. 502/350; 502/351; 423/610; 977/700; 977/762; 977/773; 977/811

(58) Field of Classification Search .................. 427/212; 428/402, 368, 379, 401, 404; 216/401; 205/401; 423/610; 977/700, 762, 811; 502/350, 351
See application file for complete search history.

(56) References Cited

U.S. PATENT DOCUMENTS

| | | | |
|---|---|---|---|
| 5,326,633 A * | 7/1994 | Clough et al. | 442/110 |
| 5,462,674 A | 10/1995 | Butters et al. | |
| 5,554,300 A | 9/1996 | Butters et al. | |
| 5,589,078 A | 12/1996 | Butters et al. | |
| 6,136,203 A | 10/2000 | Butters et al. | |
| 6,162,530 A * | 12/2000 | Xiao et al. | 428/292.1 |
| 6,215,126 B1 | 4/2001 | Butters et al. | |
| 6,306,343 B1 | 10/2001 | Sugiyama | |
| 6,329,058 B1 * | 12/2001 | Arney et al. | 428/403 |

(Continued)

FOREIGN PATENT DOCUMENTS

EP    1 314 477 A1    5/2003

(Continued)

OTHER PUBLICATIONS

Yuan et al., Titanium oxide nanotubes, nanofibers and nanowires, 2004, Colloids and Surfaces A: Physicochem. Eng. Aspects, 241, 173-183.*

(Continued)

*Primary Examiner*—Timothy C Vanoy
*Assistant Examiner*—Serena L Hanor
(74) *Attorney, Agent, or Firm*—Evan Law Group LLC

(57) ABSTRACT

A titanium oxide nanoparticle includes anatase titanium oxide, and may be a nanofiber having a minimum dimension less than 200 nanometers and having an aspect ratio greater than 20:1. A titanium oxide nanoparticle including anatase titanium oxide may include a dopant metal and/or a dopant nonmetal, and may be in a form other than a nanosphere. A method of making nanoparticles includes heating a reaction mixture in an autoclave, where the reaction mixture includes a titanium source and a polar organic solvent.

18 Claims, 14 Drawing Sheets

100

Combining ingredients including a titanium source and a polar organic solvent to form a reaction mixture — 110

Heating the reaction mixture in an autoclave at a temperature of 170°C to 300°C for at least 5 hours — 120

U.S. PATENT DOCUMENTS

| | | | |
|---|---|---|---|
| 6,398,971 | B1 | 6/2002 | Butters et al. |
| 6,413,581 | B1 | 7/2002 | Greenberg et al. |
| 6,613,300 | B2 * | 9/2003 | Mangold et al. ............ 423/278 |
| 6,673,433 | B1 | 1/2004 | Saeki et al. |
| 6,809,145 | B1 | 10/2004 | Okamura et al. |
| 7,232,556 | B2 * | 6/2007 | Yadav ..................... 423/592.1 |
| 2002/0121206 | A1 * | 9/2002 | Ooishi ...................... 101/450.1 |
| 2003/0013607 | A1 | 1/2003 | Morikawa et al. |
| 2003/0052310 | A1 * | 3/2003 | Michot et al. ............... 252/500 |
| 2003/0106488 | A1 * | 6/2003 | Huang et al. .................. 117/68 |
| 2003/0166765 | A1 | 9/2003 | Sugihara |
| 2003/0171446 | A1 | 9/2003 | Murrer et al. |
| 2004/0058149 | A1 | 3/2004 | Zhou et al. |
| 2004/0126624 | A1 * | 7/2004 | Akbar et al. ................ 428/701 |
| 2004/0265587 | A1 * | 12/2004 | Koyanagi et al. ........... 428/398 |
| 2005/0202241 | A1 | 9/2005 | Shang et al. |
| 2006/0078726 | A1 * | 4/2006 | Antonio et al. ............. 428/328 |
| 2006/0254461 | A1 * | 11/2006 | Hong et al. ............ 106/287.19 |
| 2007/0190765 | A1 | 8/2007 | Xie et al. |
| 2007/0202334 | A1 | 8/2007 | Xie et al. |

FOREIGN PATENT DOCUMENTS

| | | | |
|---|---|---|---|
| EP | 1354854 | A1 | 10/2003 |
| EP | 1 366 811 | A1 | 12/2003 |
| EP | 1 449 811 | A1 | 8/2004 |
| EP | 1 726 567 | A1 | 11/2006 |
| JP | 11279453 | A2 | 10/1999 |
| JP | 2002/030416 | A2 | 1/2002 |
| JP | 2003137549 | A * | 5/2003 |
| JP | 2004 130429 | | 4/2004 |
| WO | WO 2004/007070 | A1 | 1/2004 |
| WO | WO 2005/090236 | A1 | 9/2005 |
| WO | WO 2007/117332 | A2 | 10/2007 |
| WO | WO 2008/005055 | A2 | 1/2008 |

OTHER PUBLICATIONS

Akikusa et al., "Photoelectrolysis of water to hydrogen in p-SiC/Pt and p-SiC/n-TiO$_2$ cells," International Journal of Hydrogen Energy, 27, pp. 863-870, 2002.

Anpo et al., "The design and development of highly reactive titanium oxide photocatalysts operating under visible light irradiation," Journal of Catalysis, 216, pp. 505-516, 2003.

Armstrong et al., "TiO$_2$-B Nanowires," Angew. Chem. Int. Ed., 43, pp. 2286-2288, 2004.

Bak et al., "Photo-electrochemical hydrogen generation from water using solar energy. Materials-related aspects," International Journal of Hydrogen Energy, 27, pp. 991-1022, 2002.

Lee et al., "Structural and Morphological Behavior of TiO$_2$ Rutile Obtained by Hydrolysis Reaction of Na$_2$Ti$_3$O$_7$," Bull. Korean Chem. Soc., vol. 25, No. 7, pp. 1051-1054, 2004.

Cai et al., "Induction of Cytotoxicity by Photoexcited TiO$_2$ Particles," *Cancer Research*, 52, pp. 2346-2348, 1992.

Mohler et al., "Cancer cell motility-inhibitory protein in the Dunning adenocarcinoma model," Cancer Research, vol. 52, pp. 2349-2352, 1992.

Yuan et al., "Hierarchical interlinked structure of titanium oxide nanofibers," Chem. Commun., pp. 1202-1203, 2002.

Chemseddine et al., "Nanostructuring Titania: Control over Nanocrystal Structure, Size, Shape, and Organization," Eur. J. Inorg. Chem., pp. 235-245, 1999.

Cozzoli et al., "Low-Temperature Synthesis of Soluble and Processable Organic-Capped Anatase TiO$_2$ Nanorods," J. Am. Chem. Soc., 125, pp. 14539-14548, 2003.

Deb, "Dye-sensitized TiO$_2$ thin-film solar cell research at the National Renewable Energy Laboratory (NREL)," Solar Energy Materials & Solar Cells, 88, pp. 1-10, 2005.

Fievet et al., "Preparing Monodisperse Metal Powders in Micrometer and Submicrometer Sizes by the Polyol Process," MRS Bulletin, pp. 29-34, 1989.

Fujihara et al., "Splitting of water by electrochemical combination of two photocatalytic reactions on TiO$_2$ particles," J. Chem. Soc., Faraday Trans., 94, pp. 3705-3709, 1998.

Bach et al., "Solid-state dye-sensitized mesoporous TiO$_2$ solar cells with high photon-to-electron conversion efficiencies," Nature, vol. 395, pp. 583-585, 1998.

Grätzel, "Photoelectrochemical cells," Nature, vol. 414, pp. 338-344, 2001.

Hadjiivanov et al., "Surface Chemistry of Titania (Anatase) and Titania-supported Catalysts," Chemical Society Reviews, pp. 61-69, 1996.

Huynh et al., "Hybrid Nanorod-Polymer Solar Cells," Science, vol. 295, pp. 2425-2427, 2002.

Jana, "Shape Effect in Nanoparticle Self-Assembly," Angew. Chem., 116, pp. 1562-1566, 2004.

Jiang et al., "Ethylene glycol-mediated synthesis of metal oxide nanowires," J. Mater. Chem., 14, pp. 695-703, 2004.

Jun et al., "Surfactant-Assisted Elimination of a High Energy Facet as a Means of Controlling the Shapes of TiO$_2$ Nanocrystals," J. Am. Chem. Soc., 125, pp. 15981-15985, 2003.

Lei et al., "Preparation and photoluminescence of highly ordered TiO$_2$ nanowire arrays," Applied Physics Letters, vol. 78, No. 8, pp. 1125-1127, 2001.

Li et al., "Shape Effects on Electronic States of Nanocrystals," Nano Letters, vol. 3, No. 10, pp. 1357-1363, 2003.

Phonthammachai et al., "Structural and rheological aspect of mesoporous nanocrystalline TiO$_2$ synthesized via sol-gel process," Microporous and Mesoporous Materials, 66, pp. 261-271, 2003.

Paunesku et al., "Biology of TiO$_2$-oligonucleotide nanocomposites," Nature Materials, vol. 2, pp. 343-346, 2003.

Anpo, "Utilization of TiO$_2$ photocatalysts in green chemistry," Pure Appl. Chem., vol. 72, No. 7, pp. 1265-1270, 2000.

Purifics "Photo-Cat Water Treatment," located at www.Purifics.com, 2 pages, 2005.

Smested, "Dye sensitized and organic solar cells," Solar Energy Materials & Cells, 76, pp. 1-2, 2003.

Sugimoto, "Formation of Monodispersed Nano- and Micro-Particles Controlled in Size, Shape, and Internal Structure," Chem. Eng. Technol., 26, 3, pp. 313-321, 2003.

Sugimoto et al., "Synthesis of uniform anatase TiO$_2$ nanoparticles by gel-sol method 4. Shape control," Journal of Colloid and Interface Science, 259, pp. 53-61, 2003.

Sun et al., "Large-Scale Synthesis of Uniform Silver Nanowires Through a Soft, Self-Seeding, Polyol Process," Adv. Mater. 14, No. 11, pp. 833-837, 2002.

Trentler et al., "Synthesis of TiO$_2$ Nanocrystals by Nonhydrolytic Solution-Based Reactions," J. Am. Chem. Soc., 121, pp. 1613-1614, 1999.

Wang et al., "A Solution-Phase, Precursor Route to Polycrystalline SnO$_2$ Nanowires That Can Be Used for Gas Sensing under Ambient Conditions," J. Am. Chem. Soc., 125, pp. 16176-16177, 2003.

Wang et al., "Single Crystalline Nanowires of Lead: Large-Scale Synthesis, Mechanistic Studies, and Transport Measurements," J. Phys. Chem. B, 108, pp. 8631-8640, 2004.

Liu et al., "Preparation and Properties of Nanostructure Anatase TiO$_2$ Monoliths Using 1-Butyl-3-methylimidazolium Tetrafluoroborate Room-Temperature Ionic Liquids as Template Solvents," Crystal Growth & Design, vol. 5, No. 4, pp. 1643-1649, 2005.

Zhang et al., "Hydrothermal preparation of porous nano-crystalline TiO$_2$ electrodes for flexible solar cells," Journal of Photochemistry and Photobiology A: Chemistry, 164, pp. 159-166, 2004.

Zhang et al., "Preparation of Oxide Nanocrystals with Tunable Morphologies by the Moderate Hydrothermal Method: Insights from Rutile TiO$_2$," Langmuir, 19, pp. 967-971, 2003.

Curtis et al., "Morphology Control in the Hydrothermal Synthesis of Nanostructured Titanium Oxides," Abstract Y2.3, p. 540, in Symposium Y, Solvothermal Synthesis and Processing of Materials, vol. 878E, pp. 537-547, 2005.

Hydroxyl Systems, "Advanced Oxidation Technologies," located at www.hydroxyl.com/, 1 page, printed Jun. 28, 2005.

Site, "Matrix Photocatalytic Inc.," pp. 86-89, 2007.

Process Technologies Inc., "Alternative Treatment Technologies, TiO$_2$ Photocatalytic Destruction—Matrix Photocatlytic Inc.," located at http://sve.ucdavis.edu/MatrixPCOSummary.htm, 1 page, printed Dec. 9, 2005.

Process Technologies Inc., "TiO$_2$ Photocatalytic Destruction-(Matrix Photocatlytic)," located at http://sve.ucdavis.edu/MatrixPCORprt.htm, 11 pages, printed Dec. 9, 2005.

Fujishima et al., "Titanium dioxide photocatalysis," Journal of Photochemistry and Photobiology C: Photochemistry Reviews, 1 pp. 1-21, 2000.

Meier et al., "Redox Targeting of Oligonucleotides Anchored to Nanocrystalline TiO$_2$ Films for DNA Detection," Chemphyschem, 4, pp. 371-374, 2002.

Kubota et al., "Application of photoexcited TiO$_2$ particle to regional cancer treatment: a new approach," Reg. Cancer Treat., vol. 8, pp. 192-197, 1995.

Dunlop et al., "The photocatalytic removal of bacterial pollutants from drinking water," Journal of Photochemistry and Photobiology A: Chemistry, 148, pp. 355-363, 2002.

Duonghong et al., "Integrated Systems for Water Cleavage by Visible Light; Sensitization of TiO$_2$ Particles by Surface Derivatization with Ruthenium Complexes," Helvetica Chimica Acta, 67, pp. 1012-1018, 1984.

Kobayashi et al., "Preparation of TiO$_2$ Hollow-Fibers Using Supramolecular Assemblies," Chem. Mater., 12, 6, pp. 1523-1525, 2000.

Invitation to Pay Additional Fees dated Oct. 29, 2007 for PCT Application No. PCT/US2006/062571.

Cheng, P. et al., "Recent Progress in Titania Photocatalyst Operating Under Visible Light", Progress In Chemistry, vol. 17, No. 1, pp. 8-14, (2005).

Huang, W. et al., "Progress of Semiconductor Phogocatalysts Under Light Irradiation", Progress In Chemistry, vol. 17, No. 2, pp. 242-247, (2005).

Lin, L. et al, "Phosphor-doped Titania—a Novel Photocatalyst Active in Visible Light", Chemistry Letters, vol. 34 No. 3, pp. 284-285, (2005).

Ohno, T. et al., "Preparation of S-doped TiO$_2$ photocatalysts and their photocatalytic activities under visible light", Applied Catalysis A: General, 265, pp. 115-121, (2004).

Reddy, E.P. et al., "Transition Metal Modified TiO$_2$-Loaded MCM-41 Catalysts for Visible- and UV-Light Driven Photodegradation of Aqueous Organic Pollutants", Journal of Physical Chemistry B, 108, pp. 17198-17205, (2004).

Wu, P.G. et al. "Effects of nitrogen doping on optical properties of TiO$_2$ thin films", Applied Physics, A81, pp. 1411-1417, (2005).

Yu, J.C. et al., "Efficient Visible-Light-Induced Photocatalytic Disinfection on Sulfur-Doped Nanocrystalline Titania", Environment Science & Technology, 39, pp. 1175-1179, (2005).

Sakatani, Y. et al., "Photocatalytic Decompsotion of Acetaldehyde under Visible Light Irradiation over La$^{3+}$ and N Co-doped TiO$_2$", Chemistry Letters, vol. 32, No. 12, pp. 1156-1157, (2003).

Sakatani, Y. et al., "Metal ion and N co-doped TiO$_2$ as a visible-light photocatalyst", J. Materials Research., vol. 19, No. 7, pp. 2100-2108, (2004).

Li, L. et al., "Photocatalytic oxidation and ozonation of catechol over carbon-black-modified nano-TiO$_2$ thin films supported on Al sheet", Water Research, 37, pp. 3646-3651, (2003).

Rampaul, A. et al., "Titania and tungsten doped titania thin films on glass; active photocatalysts", Polyhedron, 22, pp., 35-44, (2003).

Langlet, M. et al., "Sol-Gel Preparation fo Photocatalytic TiO$_2$ Films on Polymer Substrates" Journal of Sol-Gel Science and Technology, 25, pp. 223-234, (2002).

Belhacova, L. et al. "Inactivation of microorganisms in a flow-through photoreactor with an immobilized TiO$_2$ layer", Journal of Chemical Technology and Biotechnology, 74, pp. 149-154, (1999).

Yu, M.J. et al., "Photocatalytic Cell Disruption of *Giardia lamblia* in a UV/TiO$_2$ Immobilized Optical-Fiber Reactor", Journal Of Microbiology And Biotechnology, 14(6), pp. 1105-1113, (2004).

Choi, Y.S. et al., "Photocatalytic disinfection of *E coli* in a UV/TiO$_2$-immobilised optical-fibre reactor", Journal of Chemical Technology and Biotechnology, 75, pp. 1145-1150, (2000).

Shchukin, D.G., "Heterogeneous photocatalysis in titania-containing liquid foam", Photochemical & Photobiological Sciences, 3, pp. 157-159, (2004).

Gracia, F. et al., "Structural, Optical, and Photoelectrochemical Properties of $M^{n+}$—TiO$_2$ Model Thin Film Photocatalysts", Journal of Physical Chemistry B, 108, pp. 17466-17476, (2004).

Litter, M.I., "Heterogeneous photocatalysis Transition metal ions in photocatalytic systems", Applied Catalysis B: Environmental, 23, pp. 89-114, (1999).

Sunada, K. et al., "Bactericidal Activity of Copper-Deposited TiO$_2$ Think Film under Weak UV Light Illumination", Environmental Science & Technology, 37, pp. 4785-4789, (2003).

Tatsuma, T. et al., "Bactericidal effect of an energy storage TiO$_2$-WO$_3$ photocatalyst in dark", Electrochemistry Communications, 5, pp. 793-796, (2003).

Fuerte, A. et al., "Visible light-activated nanosized doped-TiO$_2$ photocatalysts", Chemical Communications, pp. 2718-2719, (2001).

Selcuk, H. et al., "Photocatalytic and photoelectrocatalytic performance of 1% Pt doped TiO$_2$ for the detoxification of water", Journal Of Applied Electrochemistry, 34, pp. 653-658, (2004).

Matsunaga, T. et al., "Photoelectrochemical sterilization of microbial cells by semiconductor powers", FEMS Microbiology Letters, 29, pp. 211-214, (1985).

Li, W. et al., "Band gap tailoring of Nd$^3$—doped TiO$_2$ nanoparticles", Applied Physics Letters, vol. 83, No. 20, pp. 4143-4145, (2003).

Yan, X. et al., "Preparation, characterization and photocatalytic activity of Si-doped and rare earth-doped TiO$_2$ from mesoporous precursors", Appl. Catalysis B: Environmental 55, pp. 243-252, (2005).

Iwasaki, M. et al., "Cobalt Ion-Doped TiO$_2$ Photocatalyst Response to Visible Light", Journal of Colloid & Interface Science, 224, pp. 202-204 (2000).

Ruiz, A. et al., "Study of the influence of Nb content and sintering temperature on TiO$_2$ sensing films", Thin Solid Films, 436, pp. 90-94, (2003).

M. Sökmen, et al., "Disinfection of *E. coli* by the Ag-TiO$_2$/UV system: lipidperoxidation", Journal Photochemistry And Photobiology A:Chemistry, 143, pp. 241-244, (2001).

Belver, C, et al., "Palladium enhanced resistance to deactivation of titanium dioxide during the photocatalytic oxidation of tolune vapors", Applied Catalysis B: Environmental, 46, pp. 497-509, (2003).

International Search Report and Written Opinion dated Feb. 19, 2008 for PCT Application No. PCT/US2006/062571.

Invitation to Pay Additional Fees dated Jan. 23, 2008 for PCT Application No. PCT/US2006/062576.

Yoshida, R. et al., "Syntheses of TiO$_2$ nanowires and TiO$_2$ anatase nanowires by hydrothermal and post-heat treatments", Journal of Solid State Chemistry, 178, pp. 2179-2185, (2005).

Seo, D.S. et al., "Preparation of nanotube-shaped TiO$_2$ powder" Journal of Crystal Growth, 229, pp. 428-432 (2001).

Cai, R. et al., "Photokilling of malignant cells with ultrafine TiO$_2$ Powder", The Chemical Society of Japan, vol. 64, No. 4, pp. 1268-1273, (1991).

* cited by examiner

NANOPARTICLES CONTAINING TITANIUM OXIDE

REFERENCE TO RELATED APPLICATIONS

This application claims the benefit of U.S. Provisional Application No. 60/754,680 entitled "Nanoparticles Containing Titanium Oxide" filed Dec. 29, 2005, which is incorporated by reference in its entirety.

FEDERALLY SPONSORED RESEARCH OR DEVELOPMENT

The subject matter of this application may have been funded in part under a research grant from the National Science Foundation, under Grant Number CTS-0120978, Banner/UFAS 149646919110. The U.S. Government may have rights in this invention.

BACKGROUND

Titanium oxide ($TiO_2$) is a semiconductor substance with a wide array of industrial applications. One particularly useful property of titanium oxide is its ability to be a photocatalyst when present in the anatase phase, promoting oxidation-reduction (redox) reactions when irradiated with ultraviolet light. Titanium oxide has been investigated for applications including commercial water purification, air purification, hydrogen production by photochemical splitting of water, nitrogen fixation, odor control, antimicrobial surface coatings, self-cleaning surface coatings, and dye-sensitized solar cells.

When semiconductors such as titanium oxide are in the form of nanoparticles, their physical and chemical properties may be strongly dependent on the size, shape and crystallinity of the nanoparticles. For example, nanofibers and nanorods of titanium oxide tend to have increased photocatalytic activity relative to nanospheres. One possible explanation for this is an increased delocalization of photo-induced electrons (e−) and holes (h+) along the length of the nanofiber or nanorod surface, resulting in a decrease in the probability of e−/h+ recombination at surface defects relative to that of nanospheres. In addition, although titanium oxide can exist in a number of structure types, the anatase structure type (anatase phase) is by far the most photocatalytically active phase.

Conventional nanoparticles containing titanium oxide have a number of disadvantages. Non-spherical titanium oxide nanoparticles have been expensive to produce and difficult to obtain in large enough quantities for use in industrial or consumer applications. In addition, conventional non-spherical titanium oxide nanoparticles are in the rutile crystal phase, which is much less active photocatalytically than the anatase phase. Nanoparticles prepared by growth of titanium oxide in a physical template tend to have relatively large dimensions, which can limit their photocatalytic activity. Direct chemical synthesis of titanium oxide nanoparticles tends to produce complex titanates containing residual organic groups or other dopants that interfere with the desirable chemical and physical properties of the titanium oxide.

Non-spherical nanoparticles of titanium oxide in the anatase phase having controllable dimensions would be beneficial. Ideally, such nanoparticles would have dimensions small enough to provide useful levels of photocatalytic activity. It would be desirable to form such nanoparticles by a method that is relatively inexpensive and that can be readily scaled up to produce large quantities.

SUMMARY

In one aspect, the invention provides a nanofiber that includes anatase titanium oxide. The nanofiber has a longest dimension greater than 200 nanometers, and an aspect ratio greater than 20:1.

In another aspect of the invention, there is a nanoparticle that includes anatase titanium oxide, and at least one element selected from the group consisting of a dopant metal and a dopant nonmetal. The nanoparticle is not a nanosphere.

In yet another aspect of the invention, there is a catalytic composition that includes nanoparticles including anatase titanium oxide. When an organic substance is in contact with the composition and is irradiated with visible light, the concentration of the organic substance is reduced by 40% within 4 hours.

In yet another aspect of the invention, there is a catalytic composition that includes nanoparticles including anatase titanium oxide. When bacteria are in contact with the composition and are irradiated with visible light, the concentration of living bacteria is reduced by 20% within 20 hours.

In yet another aspect of the invention, there is a method of making nanoparticles that includes heating a reaction mixture in an autoclave at a temperature of 170° C. to 300° C. for at least 5 hours to form nanoparticles. The reaction mixture includes a titanium source and a polar organic solvent.

In yet another aspect of the invention, there is a method of making nanoparticles that includes combining ingredients to form a reaction mixture, and heating the reaction mixture in an autoclave at a temperature of 170° C. to 300° C. for at least 5 hours. The ingredients include a titanium source, a polar organic solvent, and at least one of a dopant nonmetal source and a dopant metal salt.

In yet another aspect of the invention, there is a method of making nanoparticles that includes combining ingredients including a titanium source, a polar organic solvent, a dopant nonmetal source, and a dopant metal salt to form a reaction mixture; and heating the reaction mixture in an autoclave at a temperature of 170° C. to 300° C. for at least 5 hours.

The following definitions are included to provide a clear and consistent understanding of the specification and claims.

The term "nanoparticle" means a particle with one or more dimensions of 100 nanometers (nm) or less. The term "nanoparticle" includes nanospheres, nanorods, nanofibers, and nanowires; and these nanoparticles may be part of a nanonetwork.

The term "nanosphere" means a nanoparticle having an aspect ratio of at most 3:1.

The term "aspect ratio" means the ratio of the shortest axis of an object to the longest axis of the object, where the axes are not necessarily perpendicular.

The term "longest dimension" of a nanoparticle means the longest direct path of the nanoparticle. The term "direct path" means the shortest path contained within the nanoparticle between two points on the surface of the nanoparticle. For example, a helical nanoparticle would have a longest dimension corresponding to the length of the helix if it were stretched out into a straight line.

The term "nanorod" means a nanoparticle having a longest dimension of at most 200 nm, and having an aspect ratio of from 3:1 to 20:1.

The term "nanofiber" means a nanoparticle having a longest dimension greater than 200 nm, and having an aspect ratio greater than 20:1.

The term "nanowire" means a nanofiber having a longest dimension greater than 1,000 nm.

The term "nanobelt" means a nanofiber having a cross-section in which the ratio of the width to the height of the cross-section is at least 2:1.

The term "width" of a cross-section is the longest dimension of the cross-section, and the "height" of a cross-section is the dimension perpendicular to the width.

The term "nanosheet" means a nanobelt in which the ratio of the width of the cross-section to the height of the cross-section is at least 20:1.

The term "nanocard" means a nanoparticle having a cross-section in which the ratio of the width of the cross-section to the height of the cross-section is at least 2:1, and having a longest dimension less than 100 nm.

The term "nanoprism" means a nanoparticle having at least two non-parallel faces connected by a common edge.

The term "nanonetwork" means a plurality of individual nanoparticles that are interconnected.

The "length" of a nanoparticle means the longest dimension of the nanoparticle.

The "width" of a nanoparticle means the average of the widths of the nanoparticle; and the "diameter" of a nanoparticle means the average of the diameters of the nanoparticle.

The "average" dimension of a plurality of nanoparticles means the average of that dimension for the plurality. For example, the "average diameter" of a plurality of nanospheres means the average of the diameters of the nanospheres, where a diameter of a single nanosphere is the average of the diameters of that nanosphere.

The term "quaternary oxide" means a substance containing oxygen and at least three other elements.

The term "titanium source" means a substance containing titanium and from 1 to 4 labile ligands.

The term "polar organic solvent" means a non-aqueous solvent having a dielectric constant at 25° C. of at least 10.

The term "structure directing agent" means a substance that changes the structure of nanoparticles formed from a reaction mixture containing the substance relative to the structure of nanoparticles formed from the same reaction mixture without the substance.

The term "dopant nonmetal source" means a substance containing a nonmetal element that is not oxygen, and optionally containing other elements. For example, a dopant nonmetal source may contain boron, carbon, nitrogen, fluorine, silicon, phosphorus, sulfur, chlorine, germanium, arsenic, selenium, bromine, antimony, tellurium, iodine and/or astatine.

The term "dopant metal salt" means a substance containing a metal that is not titanium, and that can provide a source of ions of the metal, where the metal ion is an ion of an element having an atomic number of 13, 20, 21, from 23 to 31, from 38 to 50, or from 56 to 83. Dopant metal salts include, for example, salts of the metal and oxides of the metal.

The term "calcination" means heating a substance at a temperature below its melting point, resulting in a removal of residual ligands.

The term "photocatalysis" means a catalysis that is dependent on the presence of electromagnetic radiation to catalyze a reaction.

The term "visible light" means electromagnetic radiation having a wavelength from 380 nm to 780 nm.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that titanium oxide and materials containing titanium oxide may be formed into nanoparticles in the presence of a polar organic solvent in a solvothermal process. The process may be carried out at lower temperatures than are conventionally used for producing titanium oxide and materials containing titanium oxide, and a calcining step is not necessary. The specific shape and size of the nanoparticles produced may be varied by changing the reaction conditions and/or the composition of the reaction mixture. The process may be performed on a large scale and may be less expensive to carry out than conventional high temperature processes.

Figure 1:
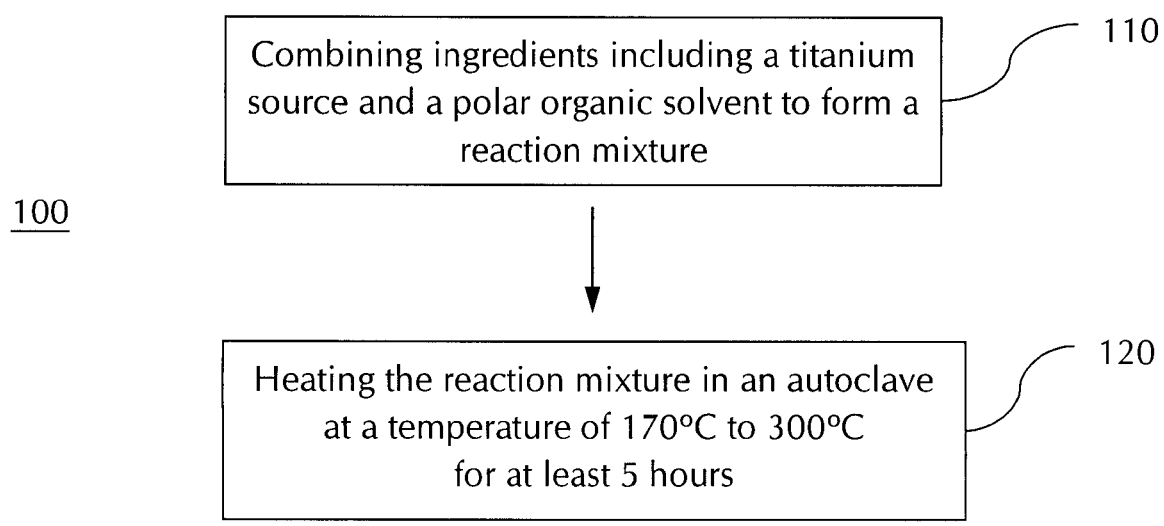
FIG. 1 depicts a method of making nanoparticles.

FIG. 1 represents a method 100 of making nanoparticles that includes combining ingredients including a titanium source and a polar organic solvent to form a reaction mixture 110, and heating the reaction mixture in an autoclave at a temperature of 170° C. to 300° C. for at least 5 hours 120. The resulting nanoparticles may contain titanium oxide. Preferably the nanoparticles contain titanium oxide in the anatase phase.

The titanium source may be any titanium compound or complex. Preferably the titanium source is a titanium(IV) halide, a titanium(IV) alkoxide, a titanium(IV) nitrate or a titanium(IV) oxysulfate. More preferably the titanium source is a titanium(IV) alkoxide.

The polar organic solvent may be any non-aqueous solvent having a dielectric constant at 25° C. of at least 10. Preferably the polar organic solvent has a boiling point at one atmosphere of pressure of at least 100° C. More preferably the polar organic solvent has a dielectric constant at 25° C. of at least 25 and a boiling point at one atmosphere of pressure of at least 150° C. Preferably the polar organic solvent is ethylene glycol.

The combining ingredients 110 may include adding other ingredients to form the reaction mixture. Examples of other ingredients include structure directing agents, water, dopant nonmetal sources and dopant metal salts. One or more of these other ingredients may be combined with the titanium source and polar organic solvent to form the reaction mixture. One or more of these other ingredients may be combined with either the titanium source or the polar organic solvent, and then combined with the remaining ingredient to form the reaction mixture. One or more of these other ingredients may be added to the reaction mixture just prior to heating the reaction mixture.

A solvothermal process includes heating the reaction mixture in an autoclave at a temperature of 170° C. to 300° C. for at least 5 hours. Heating in an autoclave may provide for the reaction mixture to be heated under pressure, either by connection to a source of pressurized gas or by sealing any volatiles that are produced when the reaction mixture is heated. Solvothermal processes typically involve reaction conditions and reagents that are milder than those used in conventional methods of forming nanoparticles, such as sol-gel, co-precipitation and solid state reactions. These conventional methods typically also require calcination and milling of the solids produced by an initial chemical reaction, and this may result in agglomeration of the particles and degradation of the particle surface. Since solvothermal processes can maintain the products in solution, non-aggregated nanoparticles with desirable surfaces can be produced.

Preferably the nanoparticles produced by method 100 contain titanium oxide in the anatase phase. A determination of whether a sample of titanium oxide is in the anatase phase may be carried out by X-ray diffraction, electron diffraction, neutron diffraction, electron microscopy, examination of physical and chemical properties, and/or by other well known methods. The method 100 may produce nanoparticles in the form of a nanorod, a nanofiber, a nanowire, a nanobelt, a nanosheet, a nanoprism, a nanonetwork, and mixtures of these. Preferably the nanoparticles are not nanospheres.

In one example, method 100 may produce a nanofiber containing anatase titanium oxide. The nanofiber may have a diameter of at most 5 nanometers (nm), and may have a diameter of from 0.5 nm to 3 nm. The nanofiber may be a nanowire, and may further have a diameter of at most 25 nm. The nanowire may have a longest dimension of at least 2 micrometers (microns), and may have a longest dimension of at least 5 microns. The nanofiber may be a nanobelt, and may have a thickness of at most 10 nm. The nanobelt may be a nanosheet having a width greater than 200 nm.

In another example, method 100 may produce a nanorod containing anatase titanium oxide. The nanorod may have a diameter of at most 30 nm and a length of at most 100 nm. The nanorod may have a diameter of at most 10 nm and a length of at most 50 nm. Method 100 may produce a nanoprism containing anatase titanium oxide. The nanoprism may have edge dimensions of at most 100 nm. Method 100 may produce a nanonetwork containing anatase titanium oxide. The nanonetwork may include nanofibers having an average diameter of at most 10 nm.

Figure 2:
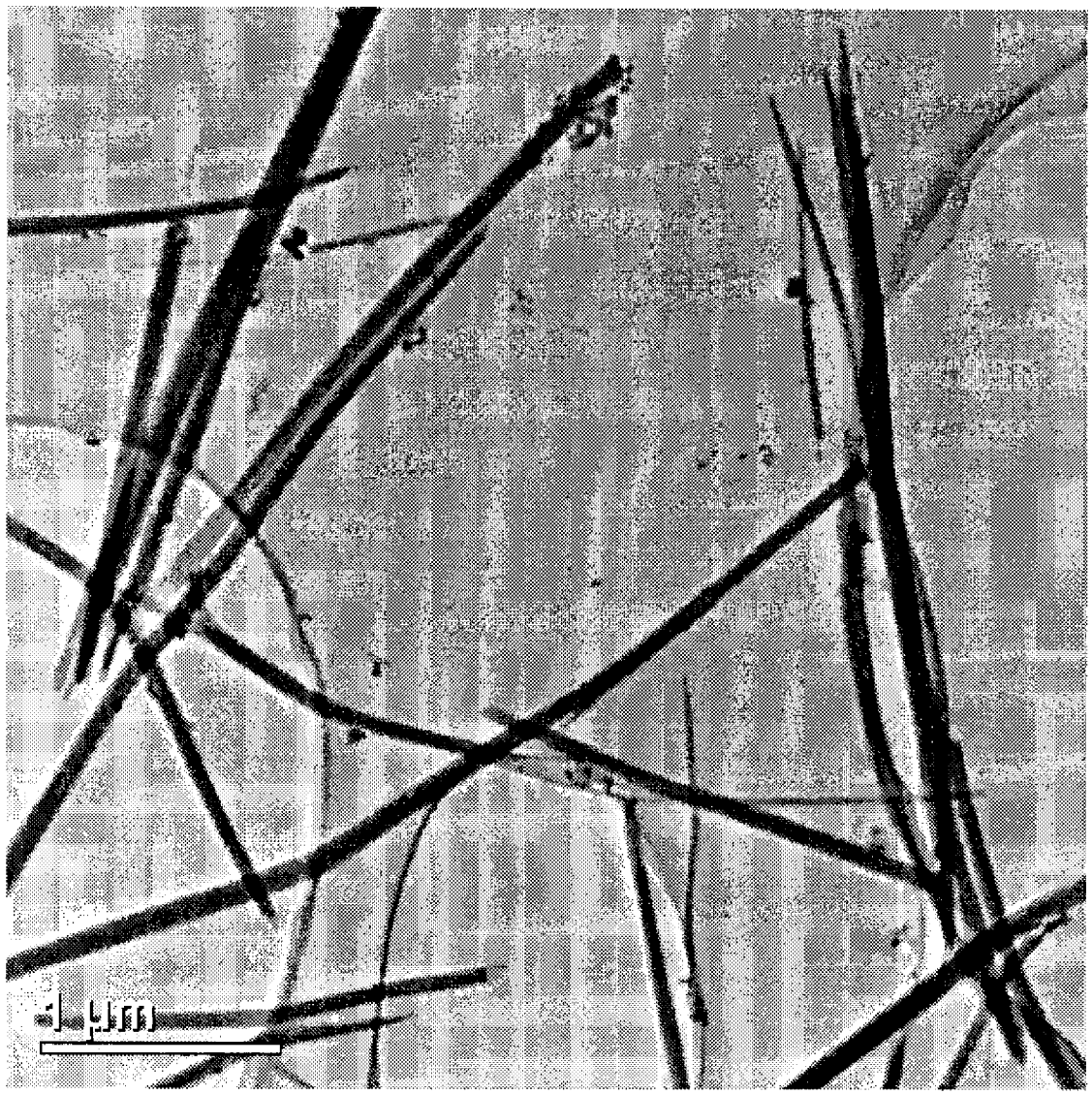
FIG. 2 is a transmission electron microscopy (TEM) image of nanoparticles formed from a reaction mixture containing a titanium source and a polar organic solvent.

FIG. 2 is a transmission electron microscopy (TEM) image of nanoparticles produced by method 100, where the ingredients included only a titanium source and a polar organic solvent. The titanium source was titanium tetraisopropoxide, and the polar organic solvent was ethylene glycol. Example 1 below provides additional experimental details on the synthesis and characterization of these nanoparticles. The nanoparticles were in the form of long solid nanowires. The average diameter of the nanowires was relatively uniform, around 40 nm, and the average length was about 5 microns. One possible explanation for the observed nanowire structure is that ethylene glycol suppressed the hydrolysis of titanium tetraisopropoxide during the reaction and served as a structure-directing agent.

Figure 3:
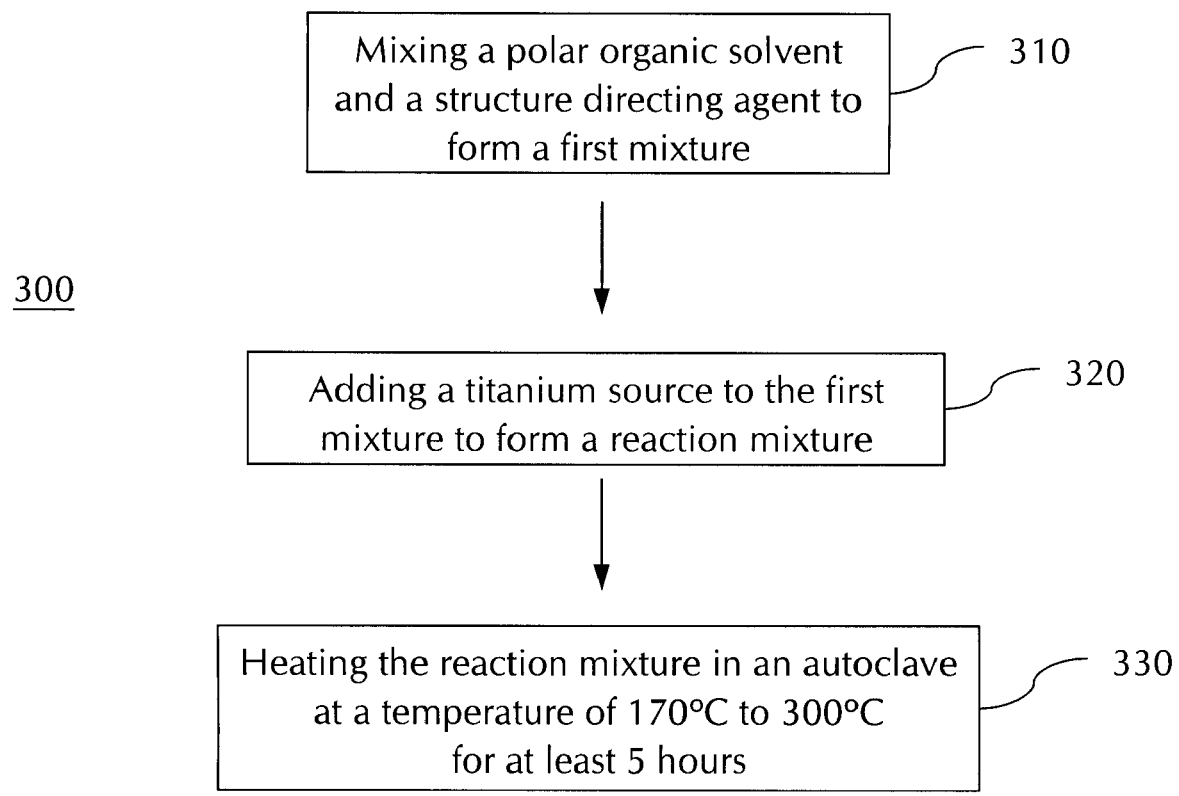
FIG. 3 depicts a method of making nanoparticles.

FIG. 3 represents a method 300 of making nanoparticles that includes mixing a polar organic solvent and a structure directing agent to form a first mixture 310, adding a titanium source to the first mixture to form a reaction mixture 320, and heating the reaction mixture in an autoclave at a temperature of 170° C. to 300° C. for at least 5 hours 330. The nanoparticles may contain titanium oxide. Preferably the nanoparticles contain titanium oxide in the anatase phase.

Mixing a polar organic solvent and a structure directing agent to form a first mixture 310 may include adding other ingredients to form the first mixture. Adding a titanium source to the first mixture to form a reaction mixture 320 may include adding other ingredients to form the reaction mixture. One or more other ingredients may be added to the reaction mixture just prior to heating the reaction mixture. Examples of other ingredients include water, dopant nonmetal sources and dopant metal salts.

The presence of a structure directing agent provides for a change in the structure of nanoparticles formed from the reaction mixture. For example, the presence of a structure directing agent in a reaction mixture may reduce the diameter of nanofibers formed relative to the nanofibers formed from the same reaction mixture without the structure directing agent. In another example, the presence of a structure directing agent in a reaction mixture may change the shape of nanoparticles formed relative to the nanoparticles formed from the same reaction mixture without the structure directing agent.

One possible explanation for the change in the structure of nanoparticles is that structure directing agents can coordinate with titanium at specific sites on a growing titanium oxide crystal. Coordination by the structure directing agent prevents further titanium oxide growth at that location, and the crystal can then only grow at other locations that are not coordinated with a structure directing agent.

A structure directing agent may include an amine, which is a compound containing one or more primary ($-NH_2$), secondary ($-NRH$) or tertiary ($-NR^1R^2$) amine groups, where R, $R^1$ and $R^2$ are organic groups. A structure directing agent may include a hydroxide ion and a counter ion. A structure directing agent may include a ketone, which is a compound containing at least one ($-C(=O)-$) group. Examples of structure directing agents include ethylene diamine, tetramethylammonium hydroxide, and 2,4-pentanedione.

Figure 4:
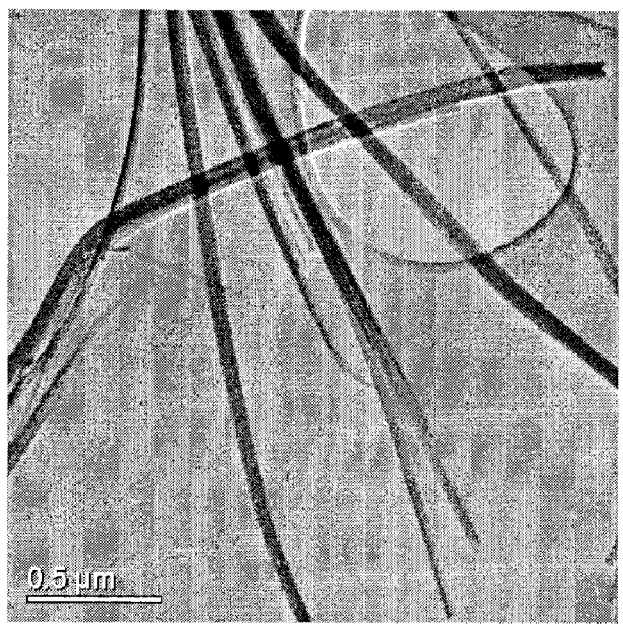
FIGS. 4-8 are TEM images of nanoparticles formed from reaction mixtures containing a titanium source, a polar organic solvent and a structure directing agent containing an amine.
Figure 5:
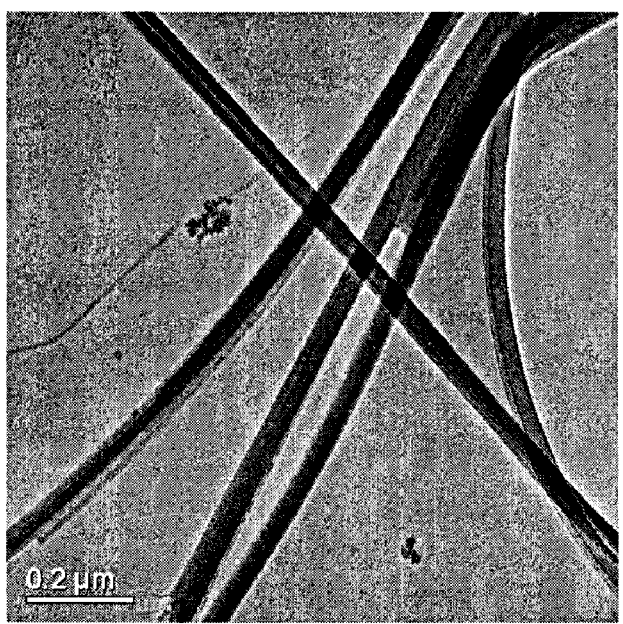
Figure 6:
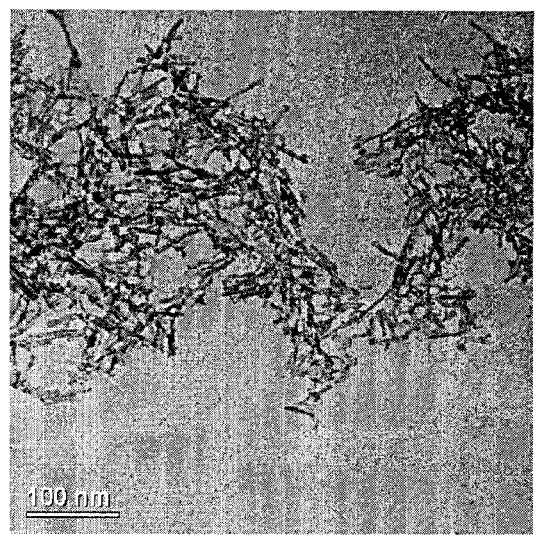

FIGS. 4-8 are TEM images of nanoparticles produced by method 300, where the structure directing agent was an amine. Specifically, the structure directing agent was ethylene diamine, the polar organic solvent was ethylene glycol, and the titanium source was titanium tetraisopropoxide. Example 2 below provides additional experimental details on the synthesis and characterization of these nanoparticles. The structure of the nanoparticles produced was dependent on the relative concentration of ethylene diamine in the reaction mixture. When ethylene diamine was present in the reaction mixture at low concentrations, the nanoparticles were in the form of long solid nanowires, as shown in FIGS. 4 and 5. These nanowires were similar to those produced without a structure directing agent in the reaction mixture (FIG. 2), but with smaller average diameters of 30 nm and 22 nm, respectively. When ethylene diamine was present in the reaction mixture at a higher concentration, the nanoparticles were in the form of short nanorods, as shown in FIG. 6. The nanorods had a smaller average diameter (5 nm) and a smaller average length (30 nm) than the nanowires.

Figure 7:
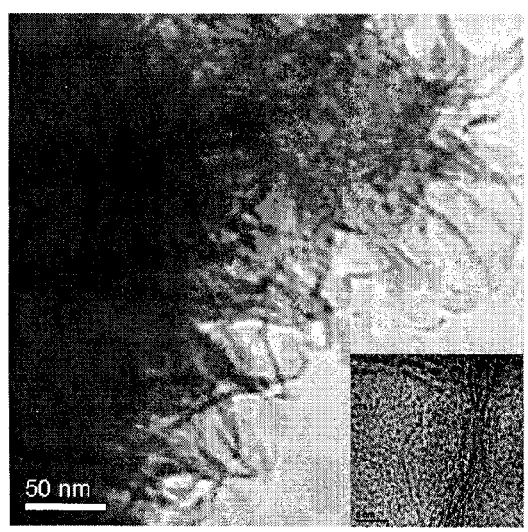
Figure 8:
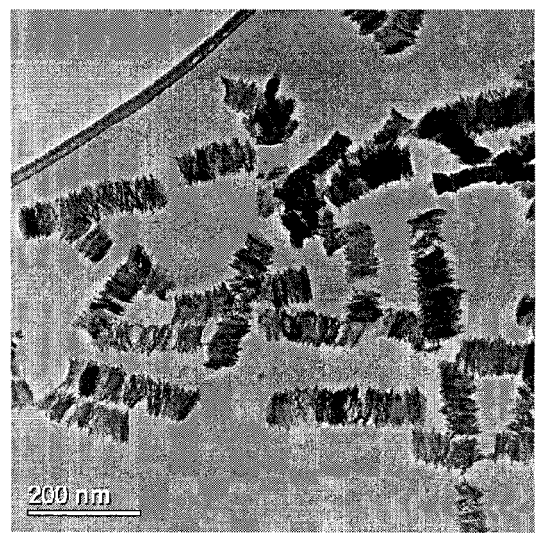

When the volume of ethylene diamine in the reaction mixture exceeded the volume of titanium tetraisopropoxide by a factor of about 3.5, the nanoparticles were in the form of thin nanofibers, as shown in FIG. 7. The nanofibers had a smaller average diameter (1.5-2.5 nm) than the nanorods, and tended to organize into an aggregated structure. When the ethylene diamine volume in the reaction mixture was increased to exceed the volume of titanium tetraisopropoxide by a factor of about 5, the nanoparticles were in the form of organized nanofibers, as shown in FIG. 8. The nanofibers were self-assembled at the mesoscale level into ordered arrays.

One possible explanation for the observed nanoparticle structure is that the amine structure directing agent restricted the growth of titanium oxide. Ethylene diamine may form a complex with titanium, and these complexes may serve as surface modifiers to inhibit the growth of titanium oxide along particular crystal faces. As the relative amount of ethylene diamine was increased, the diameter of the nanofibers decreased, resulting in a finer linear nanostructure. One possible explanation for the observed mesoscale ordering when the relative concentration of ethylene diamine in the reaction was high is that there was a balance between organic interactions between building blocks of titanium oxide and stabilizing interactions of amine-titanium complexes. At these high levels of ethylene diamine, an ordered structure may be more thermodynamically favorable than isolated or aggregated nanofibers.

Figure 9:
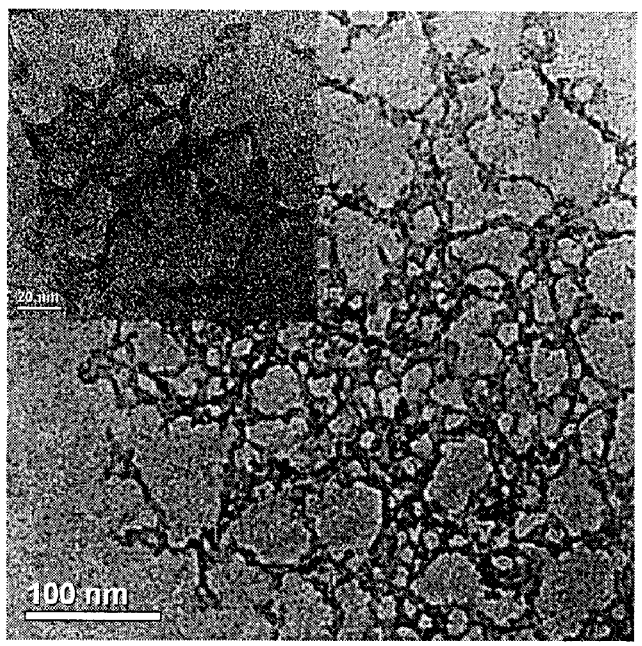
FIG. 9 is a TEM image of nanoparticles formed from a reaction mixture containing a titanium source, a polar organic solvent and a structure directing agent containing a hydroxide ion.

FIG. 9 is a TEM image of nanoparticles produced by method 300, where the structure directing agent was a hydroxide-containing salt. Specifically, the structure directing agent was tetramethylammonium hydroxide, the polar organic solvent was ethylene glycol, and the titanium source was titanium tetraisopropoxide. Example 3 below provides additional experimental details on the synthesis and characterization of these nanoparticles. The nanoparticles were in the form of a nanonetwork containing interconnected nanofibers having an average diameter of about 5 nm. One possible explanation for the observed nanonetwork structure is that the hydroxide ion adsorbed onto the titanium oxide surface, changing the surface energy and inhibiting contact between the surfaces of titanium oxide building blocks. Adsorbed hydroxide ions may act as bridges between nanofibers and/or may cause branched growth of the titanium oxide. Since defects in the grain boundaries of titanium oxide can act as electron traps, titanium oxide nanonetworks may provide an improvement in the rate of electron transfer and the efficiency of photocatalysis.

Figure 10:
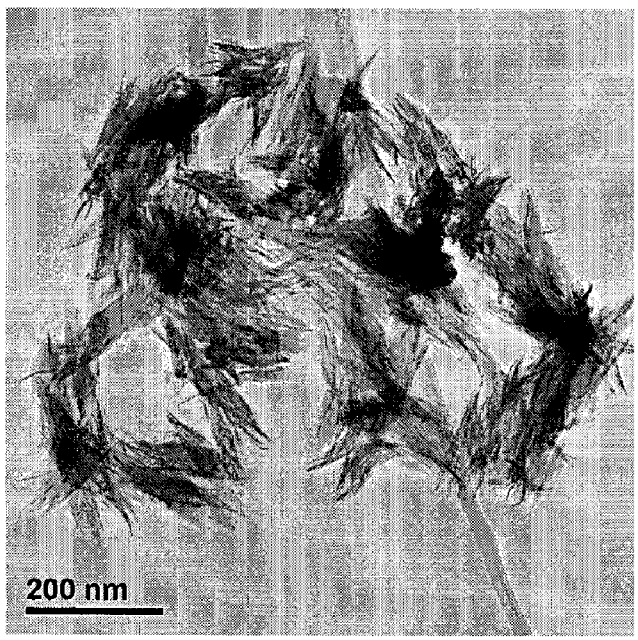
FIG. 10 is a TEM image of nanoparticles formed from a reaction mixture containing a titanium source, a polar organic solvent and a structure directing agent containing a ketone.

FIG. 10 is a TEM image of nanoparticles produced by method 300, where the structure directing agent was a ketone. Specifically, the structure directing agent was 2,4-pentandione, the polar organic solvent was ethylene glycol, and the titanium source was titanium tetraisopropoxide. Example 4 below provides additional experimental details on the synthesis and characterization of these nanoparticles. The nanoparticles were in the form of curled nanosheets having an average width of 150 nm and an average thickness of several nanometers. One possible explanation for the observed nanosheet structure is that the ketone may intercalate between sheets of titanium oxide and may exfoliate the sheets. The nanosheet formation may compete with the nanowire formation favored by the presence of the polar organic solvent, resulting in the observed curling of the nanosheets. The nanosheets did not appear to be completely separated, but rather appeared to be assembled loosely.

Figure 11:
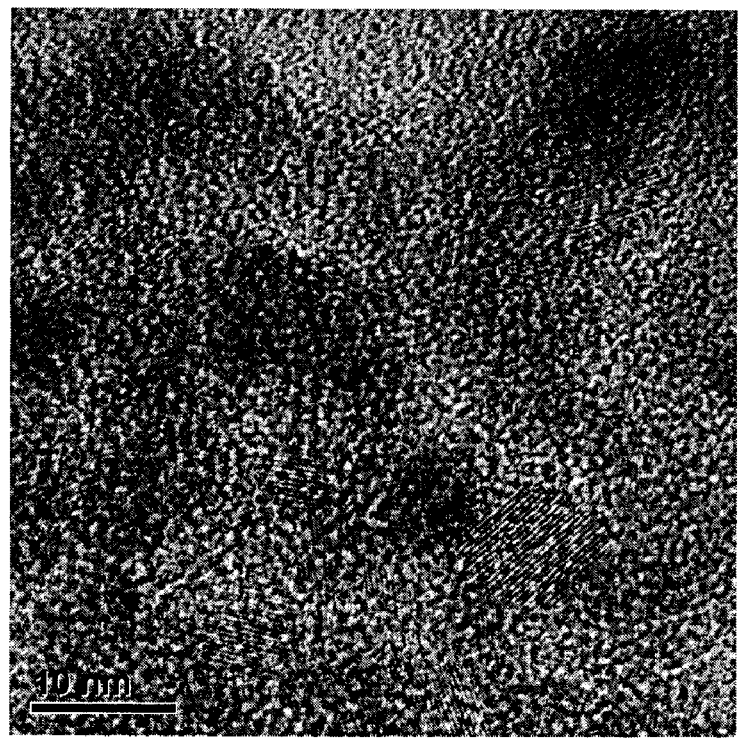
FIGS. 11-12 are TEM images of nanoparticles formed from reaction mixtures containing a titanium source, a polar organic solvent, a structure directing agent containing an amine and water.
Figure 12:
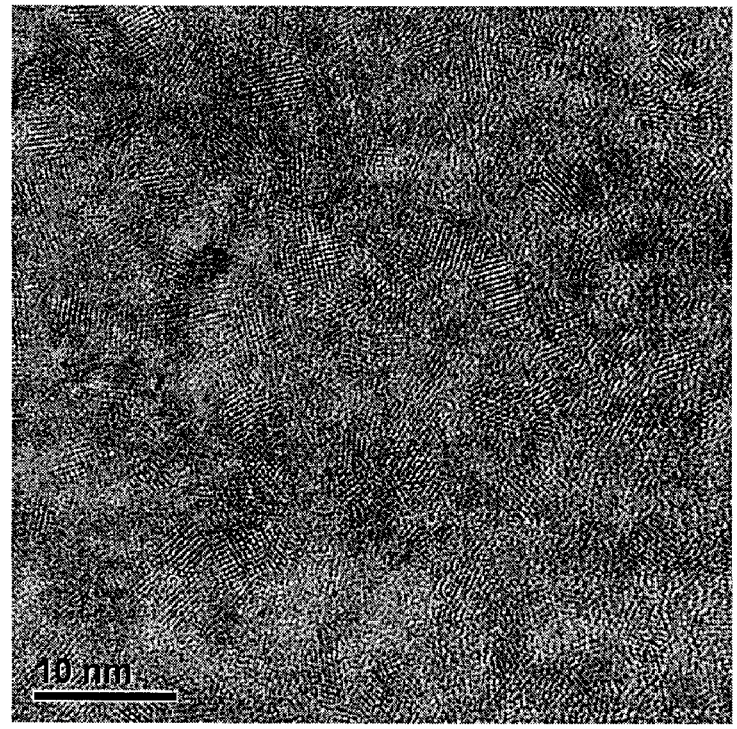

Adding a titanium source to the first mixture to form a reaction mixture 320 may include adding water after adding the titanium source. FIGS. 11 and 12 are TEM images of nanoparticles produced by method 300, where the structure directing agent was an amine, and where water was present in the reaction mixture. Specifically, the structure directing agent was ethylene diamine, the polar organic solvent was ethylene glycol, and the titanium source was titanium tetraisopropoxide. Example 5 below provides additional experimental details on the synthesis and characterization of these nanoparticles. The nanoparticles were in the form of nanospheres, and the average diameter was dependent on the relative concentration of ethylene diamine in the reaction mixture. When ethylene diamine was present in the reaction mixture at low concentrations, the average diameter was from 5 to 7 nm, as shown in FIG. 11. When ethylene diamine was present in the reaction mixture at high concentrations, the average diameter was from 1.5 to 2.5 nm, as shown in FIG. 12. One possible explanation for the observed nanosphere structure is that the presence of water provided for rapid formation of amorphous titanium oxide. Since hydrolysis and condensation are very rapid and can proceed simultaneously, the nanoparticle growth may have been controlled kinetically, rather than thermodynamically, resulting in isotropic nanoparticle growth.

Figure 13:
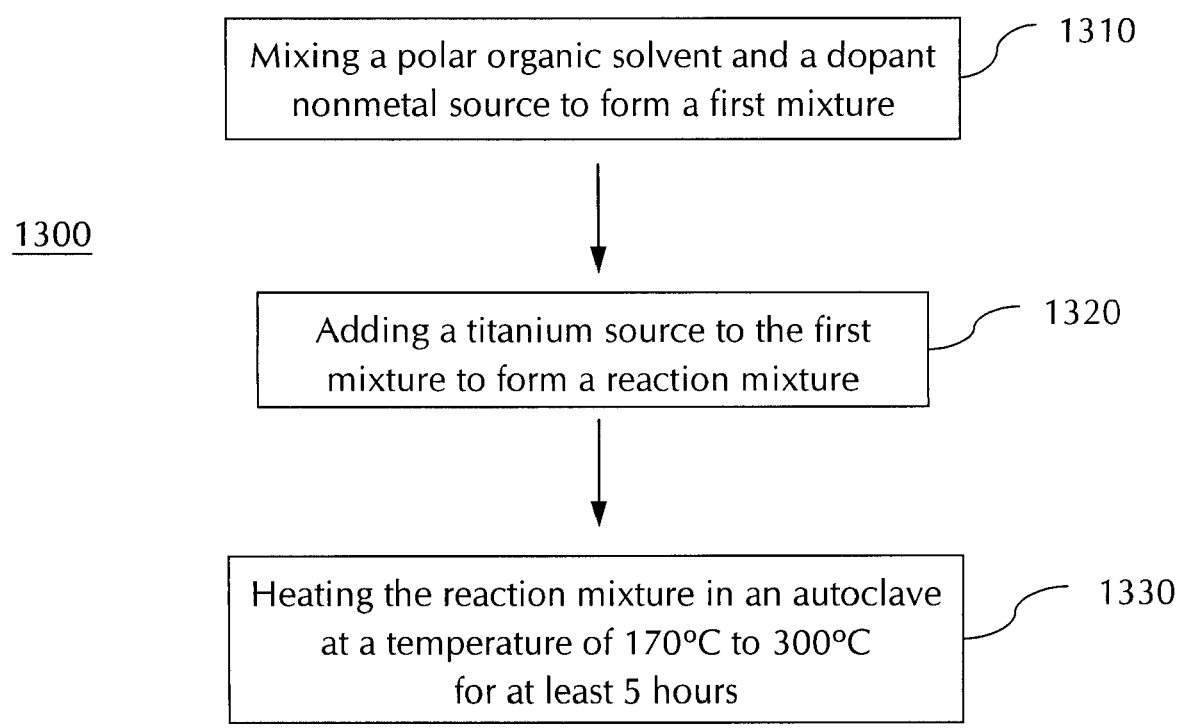
FIG. 13 depicts a method of making nanoparticles.

FIG. 13 represents a method 1300 of making nanoparticles that includes mixing a polar organic solvent and a dopant nonmetal source to form a first mixture 1310, adding a titanium source to the first mixture to form a reaction mixture 1320, and heating the reaction mixture in an autoclave at a temperature of 170° C. to 300° C. for at least 5 hours 1330. The nanoparticles may contain a ternary titanium oxide containing a dopant nonmetal, titanium and oxygen. Preferably the nanoparticles contain titanium oxide in the anatase phase.

Mixing a polar organic solvent and a dopant nonmetal source to form a first mixture 1310 may include adding other ingredients to form the first mixture. Adding a titanium source to the first mixture to form a reaction mixture 1320 may include adding other ingredients to form the reaction mixture. One or more other ingredients may be added to the reaction mixture just prior to heating the reaction mixture. Examples of other ingredients include structure directing agents, water and dopant metal salts.

The dopant nonmetal source may be a hydrogen compound, a metal compound, a component of a salt, or an organic compound. Preferably the dopant nonmetal source includes boron, carbon, nitrogen, sulfur, fluorine, or a combination of these elements. More preferably the dopant nonmetal source includes nitrogen.

Figure 14:
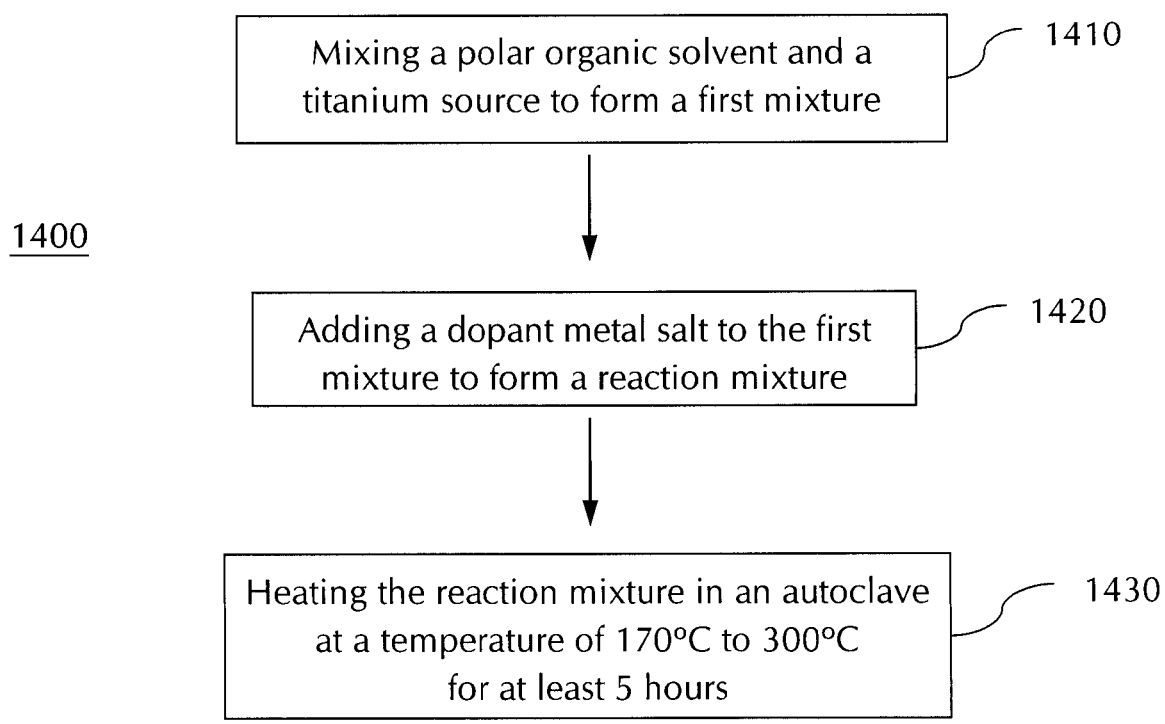
FIG. 14 depicts a method of making nanoparticles.

FIG. 14 represents a method 1400 of making nanoparticles that includes mixing a polar organic solvent and a titanium source to form a first mixture 1410, adding a dopant metal salt to the first mixture to form a reaction mixture 1420, and heating the reaction mixture in an autoclave at a temperature of 170° C. to 300° C. for at least 5 hours 1430. The nanoparticles may contain a ternary titanium oxide containing a dopant metal, titanium and oxygen. Preferably the nanoparticles contain titanium oxide in the anatase phase.

Mixing a polar organic solvent and a titanium source to form a first mixture 1410 may include adding other ingredients to form the first mixture. Adding a dopant metal salt to the first mixture to form a reaction mixture 1420 may include adding other ingredients to form the reaction mixture. One or more other ingredients may be added to the reaction mixture just prior to heating the reaction mixture. Examples of other ingredients include structure directing agents, water and dopant nonmetal sources.

The dopant metal salt may be an oxide, a sulfide, a halide, an alkoxide, a nitrate, or an oxysulfate. Preferably the dopant metal salt contains an ion of calcium, cobalt, nickel, copper, gallium, strontium, yttrium, zirconium, palladium, silver, tin, lanthanum or platinum.

The ternary titanium oxides that may be produced by methods 1300 and 1400 may provide for nanoparticles having advantageous photocatalytic properties. The presence of dopant elements within titanium oxide may narrow the semiconductor bandgap of titanium oxide, such that its photocatalytic properties can be activated by visible light rather than by ultraviolet radiation. A further improvement in the photocatalytic properties of titanium oxide may be provided by including both metal and nonmetal dopants in a quaternary titanium oxide. Quaternary titanium oxides are described, for example in U.S. Provisional Patent Application Ser. No. 60/754,679, entitled "Quaternary Oxides And Catalysts Containing Quaternary Oxides", filed Dec. 29, 2005, which is incorporated by reference.

Figure 15:
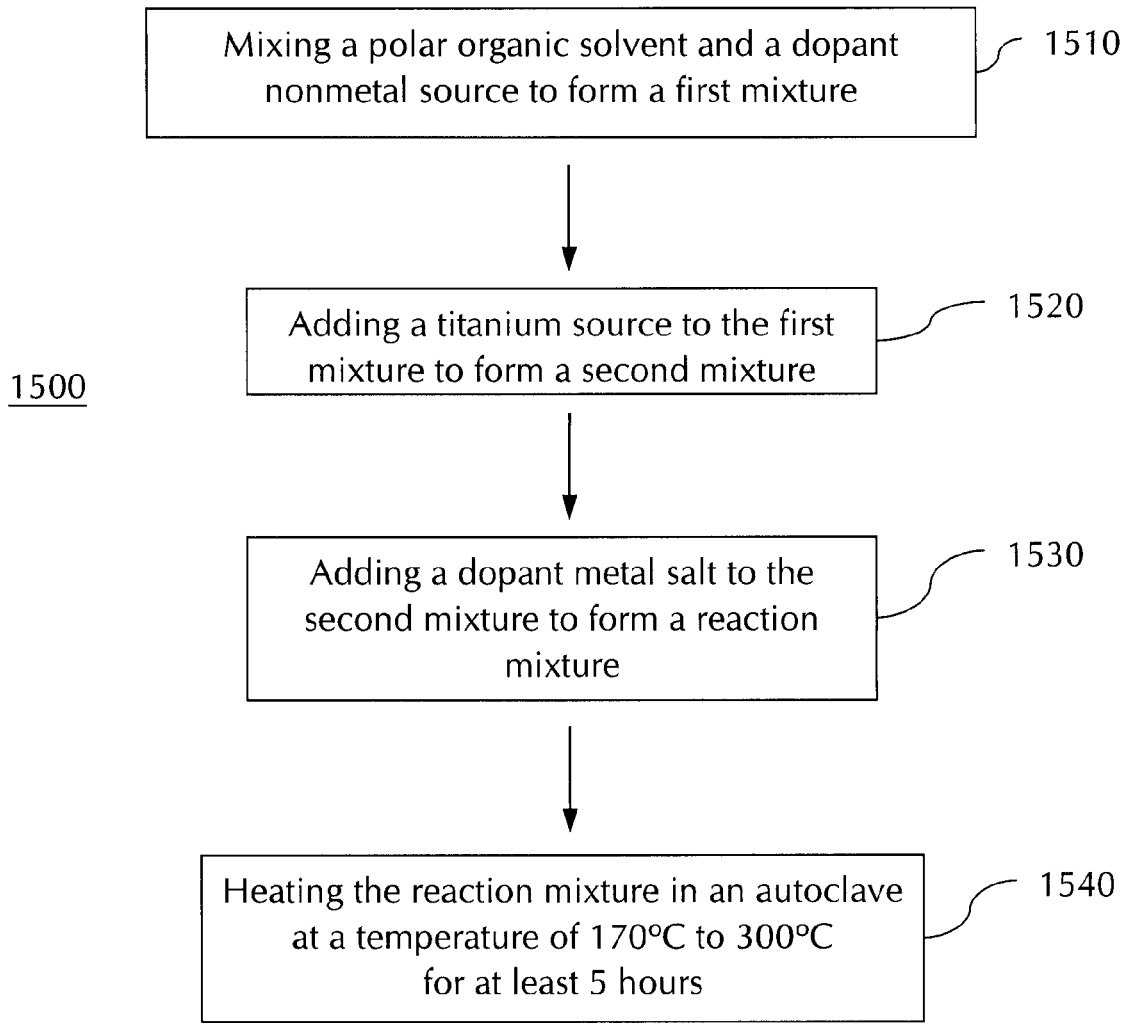
FIG. 15 depicts a method of making nanoparticles.

FIG. 15 represents a method 1500 of making nanoparticles that includes mixing a polar organic solvent and a dopant nonmetal source to form a first mixture 1510, adding a titanium source to the first mixture to form a second mixture 1520, adding a dopant metal salt to the second mixture to form a reaction mixture 1530, and heating the reaction mixture 1540 in an autoclave at a temperature of 170° C. to 300° C. for at least 5 hours. The nanoparticles may contain a quaternary titanium oxide containing a dopant metal, a dopant nonmetal, titanium and oxygen. Preferably the nanoparticles contain titanium oxide in the anatase phase.

Mixing a polar organic solvent and a dopant nonmetal source to form a first mixture 1510 may include adding other ingredients to form the first mixture. Adding a titanium source to the first mixture to form a second mixture 1520 may include adding other ingredients to form the second mixture. Adding a dopant metal salt to the first mixture to form a reaction mixture 1530 may include adding other ingredients to form the reaction mixture. One or more other ingredients may be added to the reaction mixture just prior to heating the reaction mixture. Examples of other ingredients include structure directing agents and water.

FIGS. 16-21 are TEM images of nanoparticles produced by method 300, where the heating temperature in the autoclave was varied. Specifically, the structure directing agent was ethylene diamine, the polar organic solvent was ethylene glycol, the titanium source was titanium tetraisopropoxide, and the temperature was varied from below 170° C. to 240° C. Example 6 below provides additional experimental details on the synthesis and characterization of these nanoparticles. When the reaction temperature was below 170° C., no nanoparticles were observed. One possible explanation for the lack of nanoparticle formation below 170° C. is that complexes formed between the structure directing agent and titanium were too stable to be converted into nanoparticles. When the reaction temperature was 205° C., the nanoparticles were in the form of nanowires.

Figure 16:
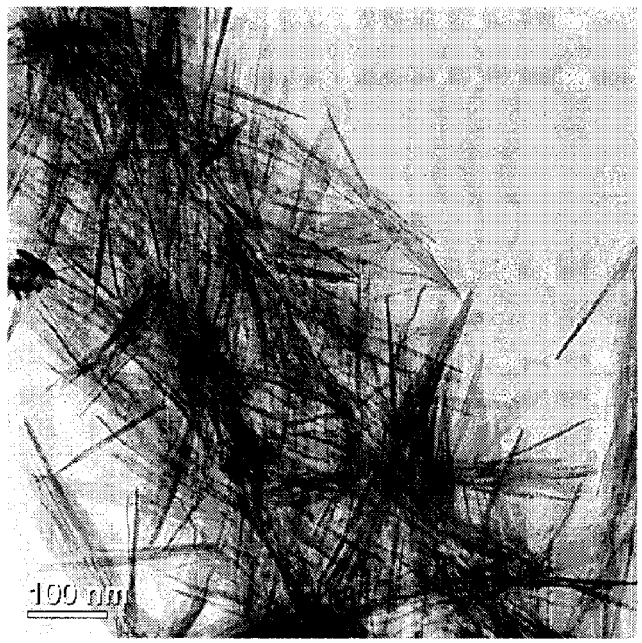
FIGS. 16-21 are TEM images of nanoparticles formed from reaction mixtures containing a titanium source, a polar organic solvent and a structure directing agent containing an amine.
Figure 17:
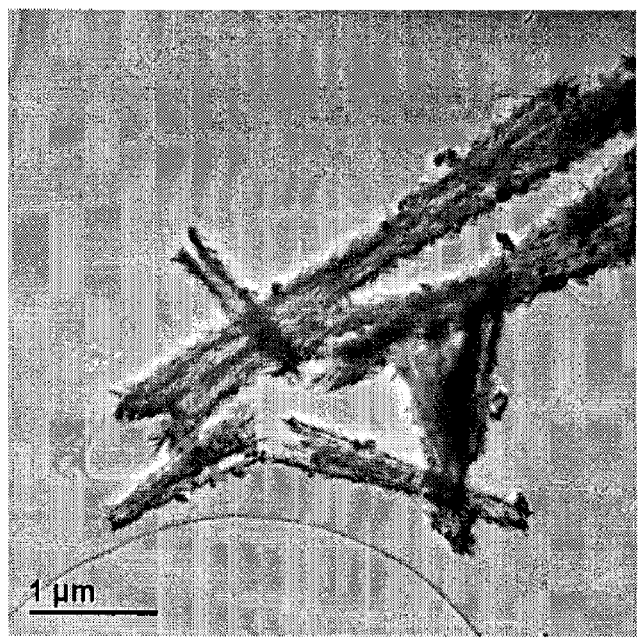

When the reaction temperature was increased to 220° C., the nanoparticles were in the form of nanowires that tended to aggregate into strands with random orientations, as shown in FIGS. 16 and 17. One possible explanation for the observed aggregation is that the nanowires may be mobile in the reaction mixture and may be flexible due to their fine dimensions. The increased solubility of the titanium source in the reaction mixture at the higher temperature may reduce the availability of the monomer to the growing nanowires, resulting in the observed fine dimensions.

Figure 18:
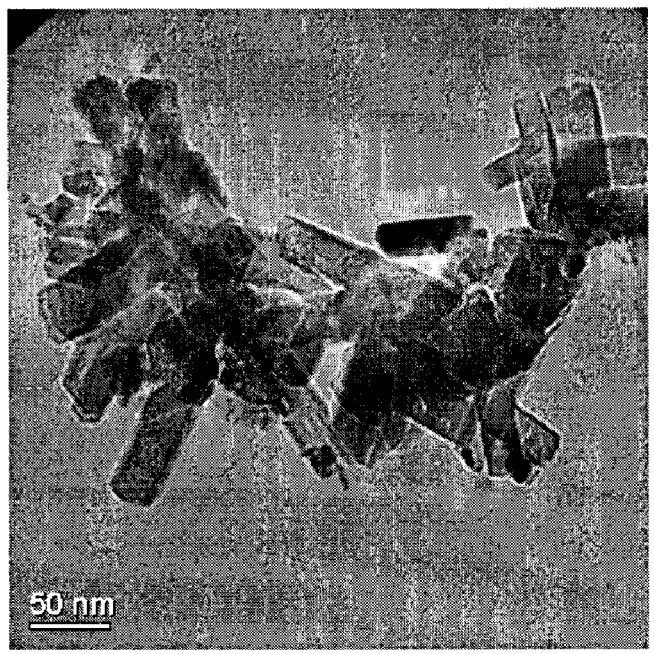
Figure 19:
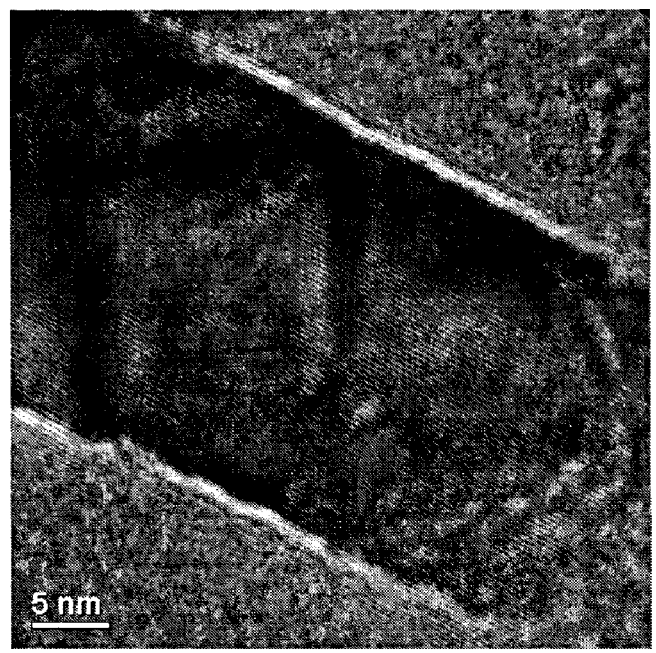
Figure 20:
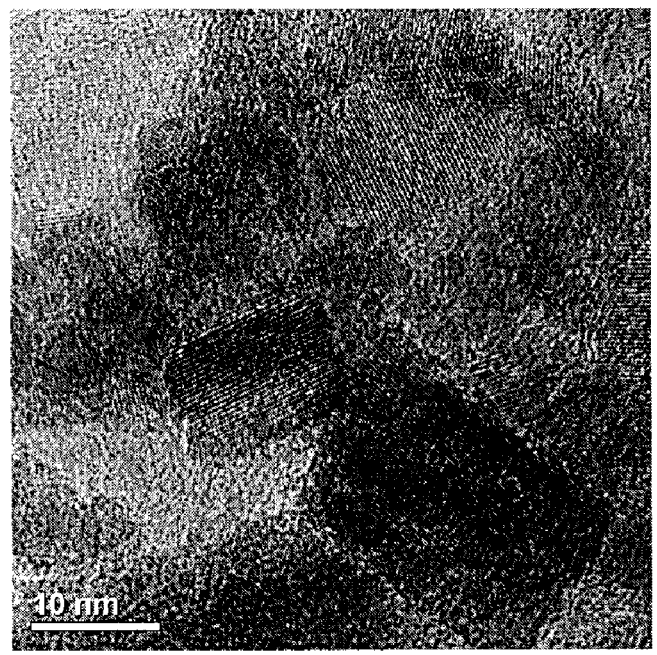
Figure 21:
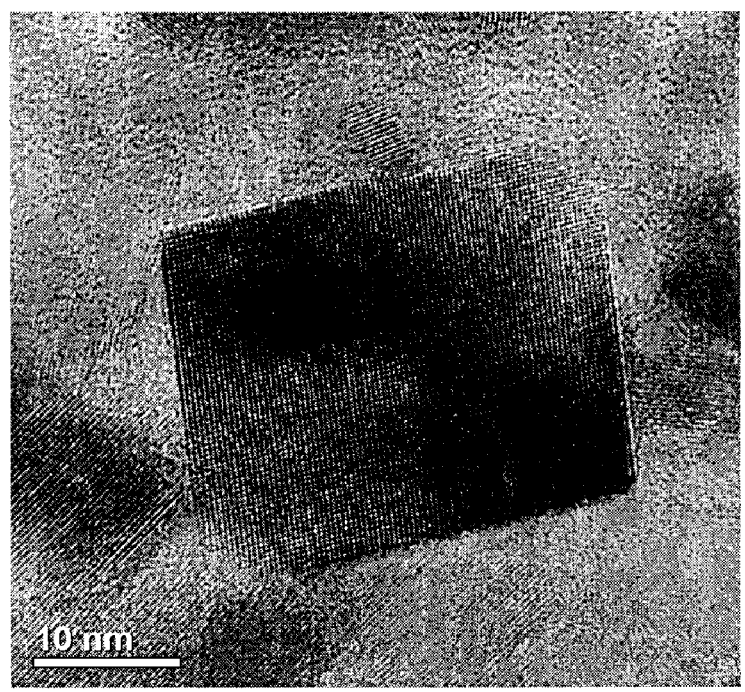

When the reaction temperature was further increased to 240° C., the nanoparticles were in the form of nanocards, which tended to aggregate in a stacked configuration, as shown in FIGS. 18 and 19. These nanocards had an average length of 70 nm and an average width of 20 nm. When the reaction temperature was maintained at 240° C. but the volume of ethylene diamine in the reaction mixture was increased to exceed the volume of titanium tetraisopropoxide by a factor of about 3.5, the nanoparticles were in the form of three-dimensional nanoprisms, as shown in FIGS. 20-21. The nanoprisms were nearly cubic, having edge dimensions ranging from 5 to 22 nm. One possible explanation for the observed nanocard and nanoprism structures is that the kinetics of the titanium oxide crystal growth were more efficient at the higher temperature, resulting in crystal shapes that were controlled by the minimization of the surface energy.

Nanoparticles containing titanium oxide can be used in a variety of applications. Examples of possible applications include catalysis, water and air purification, gas sensing, hydrogen production, solar energy production, fiber lasers, additives for composites and fabrics, and cancer therapy. In general, any application that can utilize doped or undoped titanium oxide may also utilize nanoparticles containing titanium oxide. One advantage of nanoparticles containing titanium oxide over titanium oxides that are not in a nanoparticulate form is the increased photocatalytic activity of the nanoparticles.

Catalytic compositions including nanoparticles containing titanium oxide may be used to facilitate a wide variety of reactions. A catalytic composition may include nanoparticles containing titanium oxide. The catalytic composition may be characterized by the rate of conversion of a chemical reaction when the reactants of the reaction are in contact with the composition. When an organic substance is in contact with the composition and is irradiated with visible light, the concentration of the organic substance may be reduced by 40% within 4 hours. When bacteria are in contact with the composition and are irradiated with visible light, the concentration of the bacteria may be reduced by 20% within 1 hour. The catalytic composition may be present on a support. Examples of support materials include glass, ceramic, metal, plastic and paper. The support may be porous or non-porous. Examples of porous supports include a mat of fibers, a zeolite, or a porous film. The term "on a support" includes when the composition is on at least a portion of a surface of the support. For porous supports, the term "on a support" further includes when the composition is present within the pores of the support.

In one example, a catalytic composition may be mixed with a reactant fluid and irradiated with visible light, providing for a chemical reaction of one or more ingredients of the fluid. The catalytic composition may then be recovered from the fluid and recycled for use in another portion of reactant fluid. Depending on the application and the composition of the nanoparticles, catalytic compositions including nanoparticles containing titanium oxide may be used in place of general metal catalysts such as cobalt, nickel, copper, gold, iridium, lanthanum, nickel, osmium, platinum, palladium, rhodium, ruthenium, silver, strontium, yttrium, zirconium and tin.

In another example, a catalytic composition may be present on a support, and a fluid may flow in contact with the support and the composition. In this configuration, the catalytic composition may be exposed to a constant stream of fluid and does not require separation of the composition from the fluid after the reaction is performed. For example, a catalytic composition may be present on a support in an automobile exhaust system, where the exhaust system has been fitted with a visible or UV light source, such as a fiber optic light source or an LED light source. Irradiation of the catalytic composition during operation of the automobile engine may provide for degradation of organics and other pollutants from the engine into environmentally acceptable substances.

In another example, a catalytic composition may be present on a surface that is exposed to dirt, grease and other organic and inorganic contaminants. Such a surface may be "self-cleaning" when exposed to visible light. Self-cleaning glass may have a transparent or translucent coating of a catalytic composition on one or both sides of the glass. Contaminants that contact the glass may then be degraded when the glass is exposed to visible light. It may be desirable for self-cleaning glass to have a hydrophilic surface, to provide for rinsing of any remaining degradation products from the glass with water. Examples of self-cleaning glass having surface coatings of $TiO_2$ include SunClean® glass (PPG Industries, Pittsburgh, Pa.) and Activ™ glass (Pilkington, Toledo, Ohio). A self-cleaning surface having a coating containing a quaternary oxide may also remove fingerprints from the surface automatically upon exposure to visible light.

In another example, a catalytic composition may be present on a surface that is exposed to microbes, such as bacteria and fungi, and/or to viruses. Such a surface may be a "disinfecting surface" by destroying or inactivating microbes or viruses that are present on the surface. For example, surfaces in residential, commercial or hospital environments may have a coating of a catalytic composition on the surface. Examples of surfaces that may be made into disinfecting surfaces include countertops, flooring, walls, handles, telephones, and surfaces of medical instruments.

A catalytic composition also may be applied to a surface to provide a temporary disinfection of the surface. For example, a catalytic composition may be part of a cleaning composition in the form of a liquid, a foam or a lotion. Application of the cleaning composition to a surface, followed by exposure of the surface to visible light, may cause the destruction or inactivation of microbes or viruses that are present on the surface. Such cleaning compositions may be formulated for use on skin to provide a disinfecting personal care product.

Catalytic compositions including nanoparticles containing titanium oxide may be used for air and/or water purification. For example, a catalytic composition may be mixed with contaminated air or water and irradiated with visible light. Contaminants in the air or water may be degraded into substances that are volatile or that are more easily separated from the fluid. For example, contaminants containing organic substances and halogenated substances may be degraded into carbon dioxide and halide ions, which may then be separated from the air or water. In the case of air purification, the degradation of contaminants may also result in control of odors in the air. Examples of water purification systems that use $TiO_2$ and UV radiation include the Photo-Cat® system (Purifics® ES Inc., London, Ontario, CA) and the water treatment system from Matrix Photocatalytic, Inc. (London, Ontario, CA). Examples of air purification systems that use $TiO_2$ and UV radiation include the air treatment system from Matrix Photocatalytic, Inc.

Nanoparticles containing titanium oxide may be used for sensing gases. The electrical conductivity of nanoparticles containing titanium oxide may vary depending on the chemical composition of their environment, and this variable conductivity may provide for the use of the nanoparticles to measure the type and/or amount of one or more gases. The electrical resistance of the nanoparticles or a material containing the nanoparticles may be measured in an environment and compared with the electrical resistance in a control environment. The difference between the measured resistance and the control resistance may be correlated with the amount and/or identity of a gas in the environment. These conductivity variations may be especially pronounced for nanofibers of quaternary oxides. Examples of gases that may be identified and/or measured include hydrogen, carbon monoxide, hydrogen sulfide, and water. Preferably a gas sensor using nanoparticles containing titanium oxide can be used to sense gases at ambient conditions.

Nanoparticles containing titanium oxide may be used for the production of hydrogen and oxygen from water. Splitting of water into hydrogen gas and oxygen gas using $TiO_2$ and UV radiation is described, for example, in T. Bak et al., *International Journal of Hydrogen Energy*, 27, 991-1022 (2002). Water may be decomposed into hydrogen and oxygen by photocatalysis with a catalytic composition containing the nanoparticles, when irradiated with visible light. This decomposition also may be carried out in a photo-electrochemical cell having a photo-anode containing a quaternary oxide. It may be desirable to use a photo-electrochemical cell, as this can provide for separate collection of hydrogen and oxygen from the cell.

Nanoparticles containing titanium oxide may be used for the production of electricity from solar radiation. Solar cells containing $TiO_2$ and a dye for sensitizing the $TiO_2$ are described, for example, in S. K. Deb, *Solar Energy Materials & Solar Cells*, 88, 1-10 (2005). Electric current may be produced when dye molecules are excited by exposure to light, transferring electrons into the conduction band of nanoparticles. The nanoparticles may conduct the electrons to a current collector that is connected to an electrical circuit with a load.

Nanofibers containing titanium oxide may be used for fiber lasers. The nanofibers may be used for one or more components of a laser, such as the laser cavity, gain medium, Bragg grating and fiber couplings. Nanofibers containing titanium oxide may have a direct bandgap and can thus be used to emit light.

Nanoparticles containing titanium oxide may be used as additives in composite materials, including polymer composites, fabrics and nonwoven materials. For example, nanofibers containing titanium oxide may be incorporated with other fibers into textile fabrics. These fabrics may provide for degradation of contaminants in contact with the fabric when exposed to visible light, resulting in self-cleaning or disinfecting fabrics. In another example, the ability to vary the composition of nanoparticles containing titanium oxide may provide for optimized interactions of the nanofibers with a composite matrix.

Nanoparticles containing titanium oxide may be used as bioactive agents. In an aqueous environment, such as within an organism, a nanoparticle containing titanium oxide that is irradiated with visible light may produce hydroxyl ions ($OH^-$), superoxide ions ($O_2^-$), and/or hydrogen peroxide ($H_2O_2$). A nanoparticle that is exposed to visible light while in a cell or in contact with a cell may produce a toxic environment and damage or kill the cell. Thus, nanoparticles containing titanium oxide may be used as anti-cancer agents when delivered to tumor cells. The use of $TiO_2$ and UV radiation as an anti-cancer agent is described, for example, in R. Cai et al., *Cancer Research*, 52, 2346-2348 (1992). It may be desirable to couple the nanoparticles to a targeting agent that is selectively absorbed by tumor cells. Light may be delivered to the cells containing the nanoparticles laparoscopically, resulting in cell death or a reduction in cell growth or propagation.

The following examples are provided to illustrate one or more preferred embodiments of the invention. Numerous variations may be made to the following examples that lie within the scope of the invention.

EXAMPLES

Example 1

Solvothermal Synthesis of TiO$_2$ Nanoparticles

Ethylene glycol (HO—CH$_2$—CH$_2$—OH, 50 mL) was dried at 140° C. for 1 hour with vigorous stirring in a flask under a nitrogen atmosphere. Titanium tetraisopropoxide (Ti(OCH(CH$_3$)$_2$)$_4$, 0.7 mL, reagent grade 98+%) was added, followed by stirring for 5 minutes to form a reaction mixture. The reaction mixture was then transferred to a poly(tetrafluoroethylene)-lined stainless steel autoclave and heated to a temperature of 205° C. for 12 hours, resulting in the formation of a gel precipitate. After the reaction mixture was cooled to room temperature the precipitate was filtered, washed three times with ethanol, and dried to yield a white powder of TiO$_2$ nanoparticles. All reagents and solvents were obtained from ALDRICH.

The TiO$_2$ nanoparticles were characterized by Transmission Electron Microscopy (TEM). For TEM characterization, the nanoparticles were suspended in ethanol, and the suspension was deposited on a porous carbon film supported by a copper grid. This sample was then analyzed using a JEOL 2010 F electron microscope at an operating voltage of 200 kV. FIG. 2 is a TEM image of the nanoparticles, showing the nanoparticles were in the form of long solid nanowires. The diameters of the nanowires were relatively uniform, around 40 nm, and the average length was about 5 μm.

Example 2

Solvothermal Synthesis of TiO$_2$ Nanoparticles Using Varying Amounts of Ethylene Diamine Structure Directing Agent Ethylene glycol (50 mL) was dried at 140° C. for 1 hour with vigorous stirring in a flask under a nitrogen atmosphere. Ethylene diamine (NH$_2$—CH$_2$—CH$_2$—NH$_2$) was dehydrated with MgSO$_4$ and added to the ethylene glycol to form a first mixture. The first mixture was stirred for 5 minutes, and then titanium tetraisopropoxide was added, followed by stirring for an additional 5 minutes to form a reaction mixture. The amounts of ethylene diamine and titanium tetraisopropoxide are listed in Table 1 below. The reaction mixture was then transferred to a poly(tetrafluoroethylene)-lined stainless steel autoclave and heated to a temperature of 205-250° C. for 5-12 hours, resulting in the formation of a gel precipitate. After the reaction mixture was cooled to room temperature the precipitate was filtered, washed three times with ethanol, and dried to yield a white powder of TiO$_2$ nanoparticles. All reagents and solvents were obtained from ALDRICH. The TiO$_2$ nanoparticles were characterized by TEM.

TABLE 1

Effects of Ethylene Diamine on TiO$_2$ Nanoparticle Synthesis

| Example | TTIP* | EDA** | TTIP/EDA | Structure | Diameter | Length |
|---|---|---|---|---|---|---|
| 1 | 0.7 mL | — | 0 | wire | 40 nm | 5 μm |
| 2A | 0.7 mL | 0.05 mL | 14 | wire | 30 nm | |
| 2B | 0.7 mL | 0.1 mL | 7 | wire | 22 nm | |
| 2C | 0.6 mL | 0.3 mL | 2 | rod | 5 nm | 30 nm |
| 2D | 2.84 mL | 10 mL | 0.3 | entangled fibers | 1.5-2.5 nm | |
| 2E | 1 mL | 5 mL | 0.2 | fibers in arrays | | |

*Titanium tetraisopropoxide
**Ethylene diamine

The effect of ethylene diamine was dependent on its relative concentration in the reaction mixture. Ethylene diamine at very low concentrations retained the linear form of the TiO$_2$ nanowires, but reduced the size of the anatase crystal and the diameter of the nanowires. FIGS. 4 and 5 are TEM images of the nanoparticles formed in Examples 2A and 2B, respectively, showing that the nanoparticles were in the form of highly dispersed nanowires. An increase in the ethylene diamine concentration decreased the diameter to about 5 nm and the length to 30 nm. FIG. 6 is a TEM image, showing that the nanoparticles formed in Example 2C were in the form of short nanorods.

When the ethylene diamine concentration exceeded the amount of titanium tetraisopropoxide, the TiO$_2$ nanoparticles had a fine fibril form. The fibrils were much thinner than nanorods and tended to organize into an aggregated structure. FIG. 7 is a TEM image including a high resolution TEM image in the insert. These images show that the nanoparticles formed in Example 2D were in the form of fibers having a diameter from 1.5 to 2.5 nm along the fiber length. The fibers were bundled together to form an entanglement about 60 nm. FIG. 8 is a TEM image, showing the nanoparticles formed in Example 2E were nanofibers organized by mesoscale self-assembly into ordered arrays.

Example 3

Solvothermal Synthesis of TiO$_2$ Nanoparticles Using Tetramethylammonium Hydroxide Structure Directing Agent Ethylene glycol (50 mL) was dried at 140° C. for 1 hour with vigorous stirring in a flask under a nitrogen atmosphere. Tetramethylammonium hydroxide (N(CH$_3$)$_4^+$[OH$^-$], 3.5 mL, 25% in methanol) was dehydrated with MgSO$_4$ and added to the ethylene glycol to form a first mixture. The first mixture was stirred for 5 minutes, and then titanium tetraisopropoxide (0.56 mL) was added, followed by stirring for an additional 5 minutes to form a reaction mixture. The reaction mixture was then transferred to a poly(tetrafluoroethylene)-lined stainless steel autoclave and heated to a temperature of 205° C. for 12 hours, resulting in the formation of a gel precipitate. After the reaction mixture was cooled to room temperature the precipitate was filtered, washed three times with ethanol, and dried to yield a white powder of $TiO_2$ nanoparticles. All reagents and solvents were obtained from ALDRICH. The $TiO_2$ nanoparticles were characterized by TEM. FIG. 9 is a TEM image of these nanoparticles, showing that the nanoparticles had a structure of a nanonetwork of fibers having diameters of approximately 5 nm.

Example 4

Solvothermal Synthesis of $TiO_2$ Nanoparticles Using 2,4-Pentanedione Structure Directing Agent Ethylene glycol (50 mL) was dried at 140° C. for 1 hour with vigorous stirring in a flask under a nitrogen atmosphere. 2,4-Pentandione ($CH_3$—C(=O)—$CH_2$—C(=O)—$CH_3$, 10 mL) was dehydrated with $MgSO_4$ and added to the ethylene glycol to form a first mixture. The first mixture was stirred for 5 minutes, and then titanium tetraisopropoxide (0.56 mL) was added, followed by stirring for an additional 5 minutes to form a reaction mixture. The reaction mixture was then transferred to a poly(tetrafluoroethylene)-lined stainless steel autoclave and heated to a temperature of 205° C. for 12 hours, resulting in the formation of a gel precipitate. After the reaction mixture was cooled to room temperature the precipitate was filtered, washed three times with ethanol, and dried to yield a white powder of $TiO_2$ nanoparticles. All reagents and solvents were obtained from ALDRICH. The $TiO_2$ nanoparticles were characterized by TEM. FIG. 10 is a TEM image of these nanoparticles, showing that the nanoparticles had a structure of a curled nanosheet. The nanosheets were approximately 150 nm wide, and several nanometers thick.

Example 5

Solvothermal Synthesis of $TiO_2$ Nanoparticles Using Ethylene Diamine and Water as Additives Ethylene glycol (50 mL) was dried at 140° C. for 1 hour with vigorous stirring in a flask under a nitrogen atmosphere. Ethylene diamine was dehydrated with $MgSO_4$ and added to the ethylene glycol to form a first mixture. The first mixture was stirred for 5 minutes, and then titanium tetraisopropoxide (3 mL) was added, followed by stirring for an additional 5 minutes to form a second mixture. Deionized water (0.64-1.28 mL) was added to the second mixture to form a reaction mixture, and the reaction mixture was then transferred to a poly(tetrafluoroethylene)-lined stainless steel autoclave. The reaction mixture was heated to a temperature of 205° C. for 12 hours, resulting in the formation of a gel precipitate. After the reaction mixture was cooled to room temperature the precipitate was filtered, washed three times with ethanol, and dried to yield a white powder of $TiO_2$ nanoparticles. All reagents and solvents were obtained from ALDRICH.

The $TiO_2$ nanoparticles were characterized by TEM. FIG. 11 is a TEM image of nanoparticles formed using 0.39 mL ethylene diamine, showing nanoparticles having diameters from 5 to 7 nm. Increasing the amount of ethylene diamine reduced the size of the nanoparticles. FIG. 12 is a TEM image of nanoparticles formed using 3.0 mL ethylene diamine, showing nanoparticles having diameters from 1.5 to 2.5 nm.

Example 6

Solvothermal Synthesis of $TiO_2$ Nanoparticles Using Varying Reaction Temperatures The solvothermal synthesis of $TiO_2$ was carried out as described in Example 2, except that the temperature of the autoclave was varied from below 170° C. to 240° C., and the temperature was maintained for 12 hours. The reaction temperatures and the amounts of ethylene diamine and titanium tetraisopropoxide are listed in Table 2 below. The $TiO_2$ nanoparticles were characterized by TEM.

TABLE 2

Effects of Reaction Temperature on $TiO_2$ Nanoparticle Synthesis

| Example | TTIP* | EDA** | TTIP:EDA | Temperature | Structure |
|---|---|---|---|---|---|
| 3A | 1 mL | 0.1 mL | 10 | <170° C. | no nanoparticles |
| 3B | 1 mL | 0.1 mL | 10 | 205° C. | 1-D nanowires |
| 3C | 1 mL | 0.1 mL | 10 | 220° C. | 1-D nanowires - aggregated |
| 3D | 1 mL | 0.1 mL | 10 | 240° C. | 2-D nanocards |
| 3E | 2.84 mL | 10 mL | 0.3 | 240° C. | 3-D prisms |

*Titanium tetraisopropoxide
**Ethylene diamine

No nanoparticles were observed when the reaction temperature was below 170° C. (Example 3A in Table 2). At a reaction temperature of 205° C., one dimensional (1-D) nanowires were formed (Example 3B in Table 2). An increase in the reaction temperature to 220° C. also produced 1-D nanowires, but the nanowires tended to aggregate into strands with random orientations. FIGS. 16 and 17 are TEM images of the nanoparticles formed in Example 3C, showing the nanowires and the aggregated strands, respectively.

A further increase in the reaction temperature to 240° C. produced two dimensional (2-D) or three dimensional (3-D) nanoparticles, depending on the relative concentrations of ethylene diamine and titanium tetraisopropoxide. For a titanium tetraisopropoxide to ethylene diamine volume ratio of 10, reaction at 240° C. for 12 hours produced nanoparticles having 2-D sheet structures, approximately 70 nm long and 20 nm wide. These "nanocards" tended to aggregate in a stacking configuration. FIGS. 18 and 19 are TEM images of the nanoparticles formed in Example 3D, showing the nanocards and the aggregated stacks, respectively. The stacks were highly transparent to the electron beam in the TEM, indicating that the individual nanocards were very thin. The nanoparticles were also characterized by X-ray Diffraction (XRD), using a Rigaku D-Max X-ray diffractometer with a Cu target at an accelerating voltage of 45 kV and an emission current of 20 mA. Analysis of the lattice fringes indicated that the face of the nanocard was a {001} plane of anatase $TiO_2$.

For a titanium tetraisopropoxide to ethylene diamine volume ratio of 0.3, reaction at 240° C. for 12 hours produced nanoparticles having a crystalline 3-D structure. FIGS. 20 and 21 are TEM images of the nanoparticles formed in Example 3E, showing nanoprism structures including surface areas in the shape of squares, rectangles and parallelograms. Analysis of the lattice fringes indicated that these areas were {001}, {101}, and {101} planes of the tetragonal anatase structure. Thus, the nanoparticles were nearly cubic, having edge dimensions ranging from 5 to 22 nm.

Example 7

X-Ray Diffraction Analysis

Figure 22:
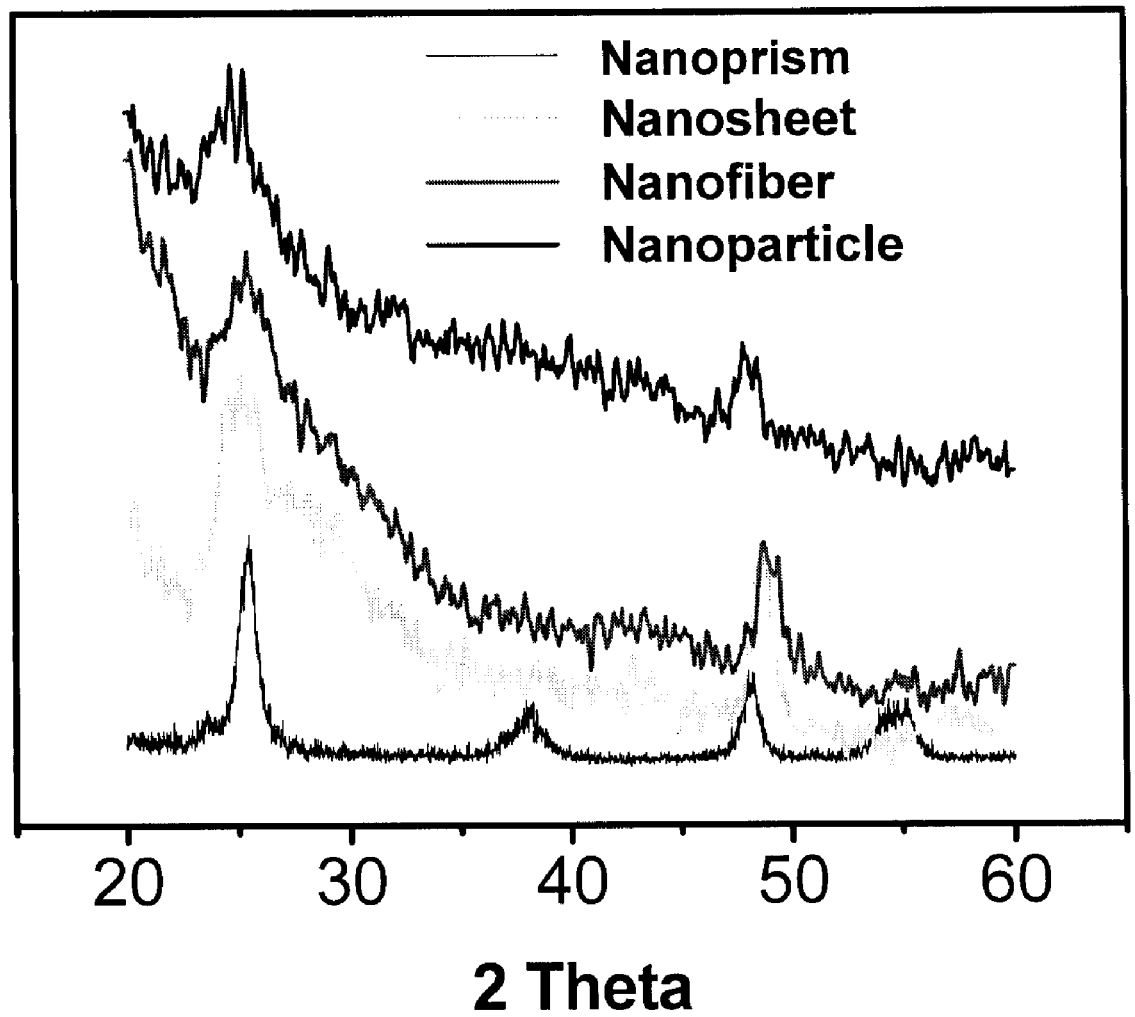
FIG. 22 is a set of X-ray diffraction (XRD) patterns for various nanoparticles.

The crystal structures of the nanoparticles of Examples 2, 4, 5 and 6 were characterized by XRD. A Rigaku D-Max X-ray diffractometer was used with a Cu target at an accelerating voltage of 45 kV and an emission current of 20 mA. All powders made at temperatures below 200° C. were amorphous except for the 2 nm $TiO_2$ nanofibers, which had an anatase structure. FIG. 22 is a set of XRD patterns for nanofibers, nanoprisms, nanosheets and nanospheres. The nanospheres and nanoprisms showed strong anatase {101} peaks. Because the particle sizes were very small, significant broadening of the peaks was evident.

Example 8

Synthesis of Pd—Ti—O—N Quaternary Oxide Nanofibers

Ethylene glycol (50 mL) was dried at 140° C. for 1 hour with vigorous stirring in a flask under a nitrogen atmosphere. Ethylene diamine (5 mL) was dehydrated with $MgSO_4$ and added to the ethylene glycol. The mixture was stirred for 5 minutes, and then titanium tetraisopropoxide (5 mL) was added, followed by stirring for an additional 5 minutes. Deionized water (2 mL) and a solution of palladium(II) acetylacetonate ($Pd(C_5H_7O_2)_2$, 50 mg) in 2 mL dichloromethane were added to the mixture, and the reaction mixture was then transferred to a poly(tetrafluoroethylene)-lined stainless steel autoclave. The reaction mixture was heated to a temperature of 205-250° C. for 5-12 hours, and then cooled to room temperature. The precipitate from the reaction mixture was filtered and washed three times with ethanol. All reagents and solvents were obtained from ALDRICH.

Example 9

Synthesis of Ag—Ti—O—N Quaternary Oxide Nanofibers

Ethylene glycol (50 mL) was dried at 140° C. for 1 hour with vigorous stirring in a flask under a nitrogen atmosphere. Ethylene diamine (5 mL) was dehydrated with $MgSO_4$ and added to the ethylene glycol. The mixture was stirred for 5 minutes, and then titanium tetraisopropoxide (5 mL) was added, followed by stirring for an additional 5 minutes. Silver nitrate ($AgNO_3$, 100 mg) dissolved in 2 mL deionized water was added to the mixture, and the reaction mixture was then transferred to a poly(tetrafluoroethylene)-lined stainless steel autoclave. The reaction mixture was heated to a temperature of 205-250° C. for 5-12 hours, and then cooled to room temperature. The precipitate from the reaction mixture was filtered and washed three times with ethanol. All reagents and solvents were obtained from ALDRICH.

Example 10

Quaternary Oxide Surface Coating On Glass

Quaternary oxide nanofibers containing Pd—Ti—O—N were made by the procedure of Example 8, except that the precipitate was not removed after the autoclave reaction. The suspension was coated onto a clean glass substrate by spin-coating. The substrate was rotated at 1,000 revolutions per minute (rpm) for 10 seconds. The coated glass was then calcined in air for 1 hour at 400° C., with a heating rate of 2° C./min. The thickness of the coating was approximately 5 micometers (μm), as measured by scanning electron microscopy (SEM).

Example 11

Quaternary Oxide Surface Coating On Stainless Steel

Quaternary oxide nanofibers containing Pd—Ti—O—N were made by the procedure of Example 8, except that the precipitate was not removed after the autoclave reaction. The suspension was separated with a centrifuge to isolate nanofibers of the Pd—Ti—O—N quaternary oxide. Approximately 1 g of the fibers were dispersed in 30 mL of ethanol, and a solution of a coupling agent in ethanol was added to form a coating mixture. The coating mixture was coated onto a stainless steel substrate by spin-coating. The substrate was rotated at 500 rpm for 10 seconds. The coated stainless steel was then calcined in air for 30 minutes. The spin-coating and calcining were repeated 3 times.

Three different coupling agent solutions were examined for the stainless steel coatings:
(a) An aluminum phosphate ($AlPO_4$) solution was prepared by dissolving 4 g $Al(NO_3)_3 \cdot 9H_2O$ and 0.5 g $P_2O_5$ in 20 mL ethanol. The calcining for the surface using this agent was performed at 200° C.
(b) A silane compound solution was prepared by dissolving 3-glycidoxy-propyltrimethoxysilane in ethanol to provide 10 mL of a 2% solution. The calcining for the surface using this agent was performed at 140° C.
(c) A fluoroalkyl-silane compound solution was prepared by dissolving tridecafluoro-1,1,2,2-tetrahydrooctyl)-trichlorosilane in ethanol provide 10 mL of a 2% solution. The calcining for the surface using this agent was performed at 140° C.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:
1. A nanofiber, comprising:
anatase titanium oxide,
where the nanofiber has a longest dimension of at least 2 micrometers, and an aspect ratio greater than 20:1.

2. The nanofiber of claim 1, having a longest dimension of at least 5 micrometers.

3. The nanofiber of claim 1, further comprising at least one element selected from the group consisting of a dopant metal and a dopant nonmetal.

4. The nanofiber of claim 3, comprising a dopant metal selected from the group consisting of calcium, cobalt, nickel, copper, gallium, strontium, yttrium, zirconium, palladium, silver, tin, lanthanum and platinum.

5. The nanofiber of claim 4, comprising a dopant nonmetal selected from the group consisting of boron, carbon, nitrogen, sulfur and fluorine.

6. The nanofiber of claim 3, comprising a dopant nonmetal selected from the group consisting of boron, carbon, nitrogen, sulfur and fluorine.

7. The nanofiber of claim 1, where the nanofiber is a nanobelt having a thickness of at most 10 nanometers.

8. The nanofiber of claim 1, where the nanofiber is a nanosheet having a width greater than 200 nanometers.

9. The nanofiber of claim 1, where the nanofiber is a nanoprism.

10. The nanofiber of claim 1, where the nanofiber is a nanowire having a longest dimension of at least 1,000 nanometers.

11. A nanoparticle, comprising:
anatase titanium oxide, and
at least one element selected from the group consisting of a dopant metal and a dopant nonmetal;
where the nanoparticle is not a nanosphere, and
the nanoparticle has a longest dimension of at least 2 micrometers.

12. The nanoparticle of claim 11, comprising a dopant metal selected from the group consisting of calcium, cobalt, nickel, copper, gallium, strontium, yttrium, zirconium, palladium, silver, tin, lanthanum and platinum.

13. The nanoparticle of claim 12, comprising a dopant nonmetal selected from the group consisting of boron, carbon, nitrogen, sulfur and fluorine.

14. The nanoparticle of claim 11, comprising a dopant nonmetal selected from the group consisting of boron, carbon, nitrogen, sulfur and fluorine.

15. The nanoparticle of claim 11, where the nanoparticle is in a form selected from the group consisting of a nanowire, a nanobelt, a nanosheet, and a nanoprism.

16. The nanoparticle of claim 15, where the nanoparticle is a nanobelt having a thickness of at most 10 nanometers.

17. The nanoparticle of claim 15, where the nanoparticle is a nanosheet having a width greater than 200 nanometers.

18. The nanoparticle of claim 15, where the nanoparticle is a nanoprism.

* * * * *